United States Patent
Bayless et al.

(10) Patent No.: US 12,531,820 B2
(45) Date of Patent: Jan. 20, 2026

(54) KNOWLEDGE GRAPH ASSISTED LARGE LANGUAGE MODELS

(71) Applicant: Amazon Technologies, Inc., Seattle, WA (US)

(72) Inventors: Samuel Bayless, Seattle, WA (US); Nadia Labai, Redmond, WA (US); Ora Yrjo Lassila, Hollis, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/478,702

(22) Filed: Sep. 29, 2023

(65) Prior Publication Data

US 2025/0112878 A1    Apr. 3, 2025

(51) Int. Cl.
*H04L 51/02* (2022.01)
*G06F 40/20* (2020.01)

(52) U.S. Cl.
CPC .............. *H04L 51/02* (2013.01); *G06F 40/20* (2020.01)

(58) Field of Classification Search
CPC ........... H04L 51/02; G06F 40/20; G06F 40/35
See application file for complete search history.

(56) References Cited

U.S. PATENT DOCUMENTS

| | | | | |
|---|---|---|---|---|
| 2021/0064932 A1* | 3/2021 | Wang | | G06N 5/02 |
| 2021/0264296 A1* | 8/2021 | Martelaro | | G06N 5/04 |
| 2022/0414228 A1* | 12/2022 | Difonzo | | G06F 40/169 |
| 2023/0169361 A1* | 6/2023 | Mitra | | G06N 3/006 |
| | | | | 706/12 |
| 2023/0245651 A1* | 8/2023 | Wang | | G06N 5/022 |
| | | | | 704/275 |
| 2023/0316006 A1* | 10/2023 | Tunstall-Pedoe | | G06N 3/0442 |
| | | | | 704/9 |
| 2024/0061833 A1* | 2/2024 | Tangari | | G06F 16/243 |
| 2024/0256618 A1* | 8/2024 | Adada | | G06F 16/9536 |

(Continued)

FOREIGN PATENT DOCUMENTS

KR    20230044729 A    4/2023

OTHER PUBLICATIONS

Search Report and Written Opinion for International Application No. PCT/US2024/043259, Dated Nov. 5, 2024, 30 pages.

*Primary Examiner* — Tonia L Dollinger
*Assistant Examiner* — Mehulkumar J Shah
(74) *Attorney, Agent, or Firm* — Athorus, PLLC

(57) ABSTRACT

Techniques for a knowledge-graph system to use large language models (LLMs) to build knowledge graphs to answer queries submitted to a chatbot by users. The knowledge-graph system builds the knowledge graph using answers produced by an LLM for novel queries. The chatbot will continue to use the LLM to answer novel queries, but the chatbot may harness the knowledge graph to answer repeat questions to gain various efficiencies over LLM-backed chatbots. For example, the knowledge-graph system may easily debug or otherwise improve the answers in knowledge graphs, store provenance information in knowledge graphs, and augment the knowledge graphs using other data sources. Thus, the reliability and correctness of chatbots will be improved as the bugs and inaccuracies in answers provided by the LLM will be corrected in the knowledge graphs, but the chatbots can still harness the abilities of LLMs to provide answers across various subject-matter domains.

22 Claims, 16 Drawing Sheets

(56) References Cited

U.S. PATENT DOCUMENTS

| | | | |
|---|---|---|---|
| 2024/0289545 A1* | 8/2024 | Miller | G06F 40/20 |
| 2024/0296279 A1* | 9/2024 | Gardner | G06F 16/90332 |
| 2024/0296425 A1* | 9/2024 | Rosenkranz | G06F 40/197 |
| 2024/0311403 A1* | 9/2024 | Bursztyn | G06F 16/3325 |
| 2024/0403086 A1* | 12/2024 | Mancuso | G06N 3/042 |

* cited by examiner

KNOWLEDGE GRAPH ASSISTED LARGE LANGUAGE MODELS

BACKGROUND

Various types of virtual agents have emerged over the years with the purposes of interacting with and providing assistance to users as though they are human assistants. One type of virtual agent, known as a chatbot, is a computer program that has conversations with users through text or speech. Traditionally, chatbots operated under rule-based systems where rules and decision trees were used to recognize specific words or phrases provided by users, and provide predefined responses to the users based on these words or phrases. However, these chatbots were fairly limited and had difficulties handling unexpected or complex queries from users. Thus, while rule-based chatbots could handle basic tasks, these chatbots had fairly limited usefulness and provided little value for users.

More recently, there have been advances in artificial intelligence (AI) that have enabled chatbots and other AI systems to perform complex tasks that normally require human intelligence. Generative AI is a type of artificial intelligence where models are used to create (or "generate") new content based on inputs, often in the form of prompts from users. One type of generative AI model is particularly effective at generating text, specifically, the large language model (LLM). LLMs are trained on large sets or corpuses of text data to perceive and infer context from user queries, understand a broader range of queries, and generate human-like textual responses to the queries. Chatbots that are backed by LLMs are becoming increasingly popular among users due to their ability to perform complex tasks on behalf of users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
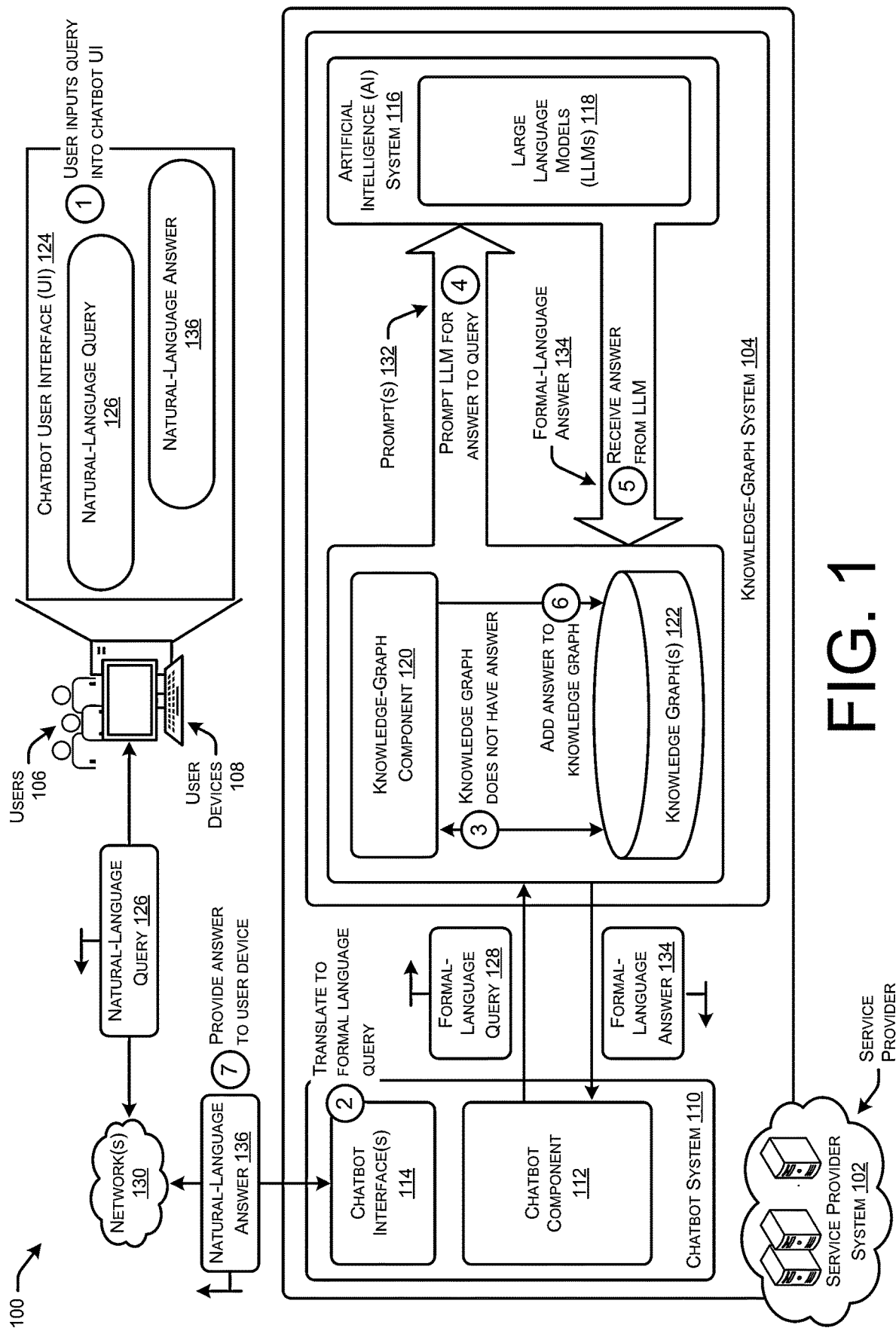
FIG. 1 illustrates a system-architecture diagram of an example environment in which a knowledge-graph system uses an LLM to generate a knowledge graph that is used by a chatbot system to answer queries of users.

This disclosure describes techniques for a knowledge-graph system to use large language models (LLMs) to build knowledge graphs to answer queries submitted to a chatbot by users. There have been recent advances in generative AI, particularly around chatbots, code generators (and other domain-specific LLMs), and similar models and services that generate text using LLMs. However, these LLM-based systems have various limitations and drawbacks, such as the time-and-resource-consuming nature of fine-tuning the LLMs, the LLMs producing wrong or misleading answers, and the difficulty in determining the source of an answer produced by LLMs. According to the techniques described herein, the knowledge-graph system builds the knowledge graph using answers produced by an LLM such that the knowledge graph grows each time a novel query is answered by the LLM. The chatbot will continue to use the LLM to answer novel queries, but the chatbot may harness the knowledge graph to answer repeat questions to gain various efficiencies over LLM-backed chatbots. For example, the knowledge-graph system may easily debug or otherwise improve the answers in the knowledge graphs, store provenance information in the knowledge graphs for answers, and augment the knowledge graphs using other data sources. In this way, the knowledge graph may be built by harnessing the knowledge and abilities of LLMs, but the various drawbacks of the LLMs may be avoided using the knowledge graph. Thus, the reliability and correctness of chatbots will be improved as the bugs and inaccuracies in answers provided by the LLM will be corrected in the knowledge graphs, but the chatbots can still harness the abilities of LLMs to provide answers across various subject-matter domains.

As noted above, chatbots are computer programs designed to have conversations with users through text or speech. Chatbots can determine answers for user queries using various types of models or algorithms, such as ruled-based models, machine-learning (ML) models, natural-language processing (NLP) models, AI models, as well as knowledge graphs. Generally, a knowledge graph is a data structure used to organize information and represent knowledge in a structured format. As suggested by their name, knowledge graphs may be graph-like data structures with nodes, edges, attributes, and labels. Nodes in the graphs represent entities or concepts (e.g., people places, objects, etc.), the edges represents relationships between the nodes, the attributes provide additional metadata or information about entities or relationships, and the labels can be attached to nodes and edges to indicate a kind of the entity or relationship being represented.

Chatbots that are backed by knowledge graphs are able to analyze and understand the rules, entities, and relationships in the knowledge graphs and use that information to answer questions of users. Due to the relatively straightforward rules and structure of knowledge graphs, they are fairly easy to build, modify, and augment. For instance, answers produced by a knowledge graph can easily be root-caused to a specific part of the knowledge graph in order to explain why a particular answer was derived for a query. This is particularly helpful for answers that are mistakes, confusing, or inaccurate. Further, the knowledge graphs can be immediately changed or modified to fix those mistakes, and the downstream effects of the modifications are easily recognizable and predictable. Thus, knowledge graphs provide an inexpensive mechanism to immediately update, repair, and alter a chatbot. However, building knowledge graphs generally requires large datasets that can be difficult to obtain, are often specific to a particular subject-matter domain. Additionally, knowledge-graph-backed chatbots can be fairly limited and have difficulties in handling unexpected or complex queries from users.

Conversely, LLMs are extremely effective at understanding and handling complex queries from users, and are able respond to arbitrary-domain questions as well. LLMs are also trained on massive amounts of data, but there are many pre-trained and readily available LLMs that do not require additional data to train. Further, the algorithms used to train the LLMs enable the LLMs to perceive and infer context from user queries, understand a broader range of queries, and generate human-like textual responses to the queries. Chatbots that are backed by LLMs are becoming increasingly popular among users due to their ability to understand complicated queries and perform complex tasks on behalf of users. LLMs are particular useful in handling and understanding queries that are novel or unseen by the LLMs, and providing answers to those queries. However, as noted above, these LLM-based chatbots have various limitations and drawbacks, such as the time-consuming nature of fine-tuning the LLMs, the LLMs "hallucinating" and producing wrong or misleading answers, and the difficulty in determining the source of an answer produced by LLMs.

According to the techniques described herein, a chatbot may answer user queries by working in conjunction with the knowledge-graph system that may generate, build, or augment a knowledge graph at least partly using answers from an LLM. When the chatbot receives a query from a user, the knowledge-graph system may initially attempt to determine an answer to the query using the knowledge graph. Queries are generally written or expressed by users in a natural language, and the knowledge-graph system may include a query evaluation engine that converts the query from the natural language and into a formal query language, such as a resource description framework (RDF) query language or a SPARQL language. In some instances, the query engine may harness a translation engine to convert the query into the query language. The query engine may then evaluate the query using the knowledge graph and determine if the knowledge graph returns results. In examples where the knowledge graph does return a result, or an "answer," to the query, the chatbot may simply provide the answer returned by the knowledge graph to the user.

However, in some examples the knowledge graph does not return any results for the query. In such examples, the knowledge-graph system may determine to prompt the LLM for an answer to the query. Depending on the LLM, the query may be submitted in the natural language form, the query language form, and/or a combination thereof. The knowledge-graph system may request that the LLM provide a truthful answer to the query, and the LLM may output an answer for the query to the knowledge-graph system.

In some instances, the knowledge-graph system may simply add the answer to the knowledge graph as an answer for the query, and provide the answer to the chatbot to use in responding to the user. However, in some instances the knowledge-graph system may perform validation techniques to determine that the answer is accurate for the query. For instance, the knowledge-graph system may ask one or more secondary LLMs to confirm that they agree with the answer being accurate for the query. As another example, the knowledge-graph system may query remote sources of data, such as Internet-based repositories to confirm the answer as being accurate for the query. In this way, the knowledge-graph system may add answers to the knowledge graph, and build the knowledge-base of the knowledge graph.

In some examples, the chatbot may provide various options and information for the users of the chatbot. As an example, the chatbot may be able to provide provenance data for the answers to the queries. The provenance data may indicate the origin or source of the answers, such as a uniform resource locator (URL) for the data source, a name of the entity that provided the answer, and so forth. The knowledge-graph system may store the provenance information in the knowledge graph and mapped to the answers. In this way, if the user requests that the chatbot provide an indication of the source of the answer, the chatbot may work with the knowledge-graph system to obtain the provenance information for the answer (or answers) and provide that information to the user. The user can then decide whether they trust the source of the answer, and follow up to confirm the answer on their own.

In some instances, the chatbot may provide a feedback mechanism through which they are able to provide feedback regarding the accuracy of an answer provided by the chatbot. As a simple example, the user may be able to highlight a portion of an answer, or simply flag the entire answer, and being incorrect or confusing. The knowledge-graph system, and/or an administrator associated with the knowledge-graph system, may determine whether the answer is accurate, either modify or remove the answer if it is determined to be inaccurate or confusing.

While the techniques described herein are described with reference to building a knowledge graph concurrently with operating a chatbot, the techniques are equally applicable for simply building or augmenting a knowledge graph without the queries coming from a chatbot. For instance, the knowledge-graph system may simply obtain a plurality of questions, which may be related to general purpose subject-matter or specific to a subject-matter domain for which the knowledge graph is to be used. The knowledge-graph system may then iteratively prompt the LLM to provide answers for the plurality of questions, and build or argument the knowledge graph using the answers. Thus, the knowledge-graph system may act or behave as a graph-as-a-service where it is able to generate, potentially from scratch, knowledge graphs using one or more LLMs. This may be advantageous because typically it takes large datasets and extensive amounts of time to generate knowledge graphs. Additionally, the knowledge-graph system may be able to improve, or augment, curated domain-specific knowledge graphs by adding general-purpose knowledge to those knowledge graphs through prompt-engineering with the LLMs.

LLMs do have "context windows" which generally represent the amount of information the LLMs can consider when processing a new input to generate content, similar to a human's short-term memory. The larger the context window, the greater amount of data can be input into, and analyzed by, the LLMs to generate a response. Thus, while it may seem intuitive for the knowledge-graph system to provide an LLMs with all information available for a question, the amount of information may exceed the size of the context window for the LLMs. As an example, the knowledge-graph system may desire to provide an entirety of the knowledge graph to the LLM for context and use when generating an answer to a query. However, the amount of data in the knowledge graph may exceed the context window size of the LLM.

To handle the context window limitations, the knowledge-graph system may provide the LLM with a portion of the knowledge graph, such as the most relevant information for the query. For example, the knowledge-graph system may determine which portion of the knowledge graph is semantically most relevant, or has answers that are relevant for the query. The knowledge-graph system may then provide the most relevant information along with the query to the LLM. Further, rather than providing the relevant information in the language or structure of the knowledge graph (e.g., semantic triples, RDF triples, etc.), the knowledge-graph system may generate a summary (potentially harnessing an LLM) of the relevant information to reduce the amount of data provided to the LLM.

A language model (e.g., large language model, small language model, etc.) is a type of artificial intelligence (AI) model that is trained on textual data to generate coherent and contextually relevant text. A "large" language model refers to a language model that has been trained on an extensive dataset and has a high number of parameters, enabling them to capture complex language patterns and perform a wider range of tasks. Large language models are designed to handle a wide range of natural language processing tasks, such as text completion, translation, summarization, and even conversation. The specific parameter count required for a model to be considered a "large" language model can vary depending on context and technological advancements. However, traditionally, large language models have millions to billions of parameters.

Although some of the techniques described herein are with reference to large language models, the techniques are equally applicable to any type of language model, such as small language models, domain-specific language models, transformer-based models, unified language models, and other types of language models.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a knowledge-graph system 104 of a service provider system 102 uses an LLM to generate a knowledge graph that is used by a chatbot system 110 to answer queries of users.

The service provider system 102 may be operated and/or managed by a service provider and may provide one or more services to users. As described in more detail below, the service provider system 102 may be or include a cloud system that provides services and resources to fulfil their computing resource needs, such as cloud-based computing resources. In other examples, the service provider system 102 may simply support and provide a chatbot system 110 that includes hardware (e.g., computing devices, network connections etc.) and computer programs designed to have conversations with users through text or speech. In some instances, the service provider system 102 may be a private network, such as an enterprise network, an on-premises network, and so forth.

The chatbot system 110 can determine answers for queries of the users 106 using knowledge graphs and/or LLMs as described herein. The chatbot system 110 may include a chatbot component 112 that serves as an orchestrator for the chatbot system 110 and communicates with other components, as well as one or more chatbot interfaces 114 that provide mechanisms through which the users 106 can submit queries. The chatbot interfaces 114 may be a chat interface through which users 106 and/or programs are able to submit text (and other input) prompts. However, the chatbot interfaces 114 may be any type of interface through which software and/or users 106 can communicate with the chatbot system 110, such as CLIs, APIs, or any other type of software instructions.

As shown, a user 106 may utilize a user device 108 to, at 1, submit a query into a chatbot user interface (UI) 124. The query may be input as a natural-language query 126 in a plain or natural language of a user 106, such as a human language that is used by humans to communicate. At 2, the chatbot interface 114 may receive the natural-language query 126, and the chatbot component 112 may translate the natural-language query 126 into a formal-language query 128. The formal language may be any type of language that is usable to query a knowledge graph 122. For instance, the formal language may be a structured query language (SQL), a SPARQL Protocol and RDF Query Language (SPARQL), a resource description framework (RDF) language, or any other formal query language. The chatbot component 112 may use various models or algorithms to convert the natural-language query 126 into the formal-language query 128, such as one or more LLMs configured to translate between the languages.

The chatbot system 110 may provide the formal-language query 128 to the knowledge-graph system 104. Thus, the chatbot system 110 may answer user 106 queries by working in conjunction with the knowledge-graph system 104 that may generate, build, or augment a knowledge graph 122 at least partly using answers from an LLM 118 of an AI system 116. When the chatbot system 110 receives the query 128 from a user 106, the knowledge-graph system 104 may, at 3, initially attempt to determine an answer 134 to the query 128 using the knowledge graph 122. A knowledge-graph component 120 may include a query evaluation engine evaluates the formal-language query 128 using the knowledge graph 122 to determine if the knowledge graph 122 returns results for the particular query (e.g., answers). In examples where the knowledge graph 122 does return a result, or a formal-language answer 134, to the formal-language query 128, the chatbot system 110 may simply convert the formal-language answer 134 to a natural-language answer 136 and provide the natural-language answer 136 determined using the knowledge graph 122 to the user 106.

However, in some examples the knowledge graph 122 does not return any results for the formal-language query 128. In such examples, the knowledge-graph component 120 may determine to, at 4, submit a prompt 132 to the LLM 118 for the answer 134 to the query 128. Depending on the LLM 118, the query 128 may be submitted in the natural language form, the formal language form, and/or a combination thereof. The knowledge-graph system 104 may request that the LLM 118 provide a truthful answer 134 to the query 128, and the LLM 118 may output, at 5, the formal-language answer 134 for the query 128 to the knowledge-graph component 120.

In some instances, the knowledge-graph system 104 may simply, at 6, add the formal-language answer 134 to the knowledge graph 122 as an answer for the formal-language query 128, and provide the formal-language answer 134 to the chatbot system 110 to use in responding to the user 106. However, in some instances the knowledge-graph system 104 may perform validation techniques to determine that the formal-language answer 134 is accurate for the formal-language query 128. For instance, the knowledge-graph system 104 may ask one or more secondary LLMs (not illustrated) to confirm that they agree with the formal-language answer 134 being accurate for the formal-language query 128. As another example, the knowledge-graph system 104 may query remote sources of data, such as Internet-based repositories to confirm the formal-language answer 134 as being accurate for the formal-language query 128. In this way, the knowledge-graph component 120 may add answers to the knowledge graph 122, and build the knowledge-base of the knowledge graph 122. At 7," the chatbot system 110 may provide the natural-language answer 136 to the user 106 for presentation on the chatbot UI 124. In some instances, the answer may, at least partially, be a natural-language answer 136 that is presented to the user 106.

While the techniques described herein are described with reference to building a knowledge graph 122 concurrently with operating a chatbot system 110, the techniques are equally applicable for simply building or augmenting a knowledge graph 122 without the formal-language queries 128 coming via a chatbot system 110. For instance, the knowledge-graph system 104 may simply obtain a plurality of questions, which may be related to general purpose subject-matter or specific to a subject-matter domain for which the knowledge graph 122 is to be used. The knowledge-graph system 104 may then iteratively prompt the LLM 118 to provide formal-language answers 134 for the plurality of questions, and build or argument the knowledge graph 122 using the answers 134. As another example, the knowledge-graph component 120 may select a subject matter area, and ask the LLM(s) 118 to explore a concept iteratively and repeatedly in that space and build a knowledge graph 122 using those questions and answers. Thus, the knowledge-graph system 104 may act or behave as a graph service where it is able to generate, potentially from scratch, knowledge graphs 122 using one or more LLMs 118. This may be advantageous because typically it takes large datasets and extensive amounts of time to generate knowledge graphs 122. Additionally, the knowledge-graph system 104 may be able to improve, or augment, curated domain-specific knowledge graphs by adding general-purpose knowledge to those knowledge graphs 122 through prompt-engineering with the LLMs 118.

The AI system 116 provides artificial intelligence, which generally refers to the ability for computers to perform tasks that normally require human intelligence, such as perceiving, synthesizing, and inferring information. Generally speaking, AI systems 116 and models ingest large amounts of data (or "training data"), analyze this data to identify correlations and patterns, and use these patterns to make predictions about future states. Although AI programs and algorithms have been around for decades, the amount of data and computing power needed to train AI models that are useful for humans has not existed. However, there have been various technological breakthroughs and advances that have accelerated the usefulness of AI, such as advent of cloud computing that provides effectively unlimited compute, advances in specialized hardware (e.g., graphics processing units (GPUs)) that efficiently train and run these AI models, and the discovery of more efficient training algorithms.

One type of artificial intelligence that has benefited greatly from these advances is generative AI. Generative AI is a type of artificial intelligence where AI models are used to create (or "generate") new content based on inputs, often in the form of prompts from humans. Various types of generative AI models exist that are trained to generate different types of data or content, such as text, images, audio (e.g., music or voices), and synthetic or other virtual data. Similar to other forms of AI, generative AI models use machine learning (ML) techniques to learn how to create content that exhibits characteristics learned from the training data used to train the models. More specifically, generative AI models use neural networks (and/or other ML algorithms) to learn the underlying correlations, patterns, and structures of datasets and generate new content.

One type of neural network architecture that has gained popularity due to its ability to reduce the amount of time needed to train generative AI models is known as the Transformer model, or simply "Transformers." Transformers apply a set of mathematical techniques, called attention or self-attention, to capture relationships in sequential data called tokens, such as words in a sentence. Transformers are able to detect subtle causal relationships between data elements in a series, including how even distant data elements influence and depend on each other. Unlike previous models that have to process tokens sequentially (e.g., Recurrent Neural Networks (RNNs)), transformers use an attention mechanism to process tokens simultaneously and calculate the attention weights, or strengths of relationships, between the tokens in successive layers. Because transformers can compute attention weights for all the tokens in parallel, the amount of time needed to train generative AI models using transformers is greatly improved over other training models.

Generative AI can be used to generate text that resembles human-like responses to prompts. Transformers are very effective in training the models used generate text, often referred to as Large Language Models (LLMs 118). LLMs 118 are trained on large sets or corpuses of text data to generate human-like textual responses to prompts. LLMs 118 are generally trained in two stages, pre-training and fine-tuning. During the pre-training stage, LLMs 118 are trained on massive datasets of unlabeled text data (or "unsupervised learning") where transformers allow the LLMs 118 to process and learn the patterns and relationships between words. During the fine-tuning stage, the LLMs 118 can be fine-tuned for specific tasks or prompts, such as summarizing content, answering questions, and text completion. There are generalized LLMs 118 that have been trained on sets of text data describing all types of content (e.g., data obtained from crawlers that scrape the public Internet). There are also specialized LLMs 118 that have been trained on specialized sets of data that are specific to a particular type of content, such as travel or shopping.

There have been many developments in large-scale machine learning and deep learning models. For example, Generative Pretrained Models version 3 (GPT-3) is trained on 570 GB of text and consists of 175 billion parameters. While large models may have state-of-the-art performance, in various scenarios it may be desirable to deploy a smaller model. Knowledge distillation is a technique that transfers knowledge from a complex neural network (the "teacher model") to a simpler one (the "student model"). The teacher model is trained on labeled data, and the student model is trained to mimic the teacher's behavior using unlabeled data of "soft targets", which are probability distributions indicating the teacher's confidence in its predictions. By minimizing the difference between the student's predictions and the teacher's soft targets, the student model can learn from the teacher's knowledge and achieve similar or better performance, even with fewer parameters.

Organizations continue to train and use, or offer for use, generative AI models to perform various tasks. To interact with text-based generative AI models, or LLMs 118, users 106 are presented with a text box through which they can submit prompts for an agent representing the LLMs 118 to analyze and answer. In addition to prompts or instructions, users 106 can also provide additional data to the agent for analysis. For instance, a user 106 can request that a generative AI agent analyze a dataset that is uploaded or otherwise input to the LLMs 118 of the agent. The generative AI agent can then utilize the LLMs 118 to analyze the uploaded data and perform the task, such as text summarization or data synthesis of the data. These generative AI models have "context windows" which generally represent the amount of information the AI models can consider when processing a new input to generate content, similar to a human's memory. The larger the context window, the greater amount of data can be input into, and analyzed by, the AI models to generate a response. Thus, while it may seem intuitive for a user to provide an AI model with all information available for a question, the amount of information may exceed the context window for the AI model. In such situations, the user may instead determine to provide only the most pertinent information for the AI model when prompting the AI model to perform a task.

Generally, the LLMs 118 can only analyze a limited number of tokens (think of a token as about half a word, or approximately ~4 characters). For example, the LLM 118 used may have a context window of 4096 tokens, which is approximately 4096*4 characters (the exact token-character mapping depends on the specific text provided). A key engineering challenge of working with current-generation LLMs 118 is managing that limited context window. The combination of the chat history and the response from the LLM 118 must sum to at most 4096 tokens in this example. If too many tokens are provided in the chat history, the API will fail.

A language model context window refers to the range of text that a language model considers when processing or generating a specific word or token within a given sequence of text. It represents the surrounding words or tokens that the model uses to understand the context of the current word or token. The size of this context window is determined by the architecture of the language model. The context window is helpful for language models to generate coherent and contextually accurate responses in various natural language processing tasks, such as text completion, translation, question answering, and more. It enables the model to consider the broader context and semantic meaning of words, ensuring that its output aligns with the input text's intended meaning. The size of this window varies depending on the model but typically includes both preceding and following words in a text sequence. Larger windows may accommodate additional information, such as relevant information added via retrieval augmented generation (RAG). However, it's important to note that larger context windows can be computationally expensive, so the size of the context window may vary depending on the specific language model architecture and resource constraints.

The users 106 may have created user accounts with the service provider system 102 to utilize the resources of the service provider system 102. The users 106 may utilize their user devices 108 to communicate over one or more networks 130 (e.g., WANs, PANs, LANs, etc.) with the service provider system 102. The user devices may comprise any type of computing device configured to communicate over network(s) 130, such as mobile phones, tablets, laptop computers, desktop computers, televisions, servers, and/or any other type of computing device. The users 106 may interact with the service provider system 102, via their user account and/or one or more user portals or consoles (e.g., web console, CLI, API, etc.).

Generally, the knowledge-graph system 104, and components thereof, may comprise software, firmware, and/or other logic that is supported one computing device, or across more computing devices in the service provider system 102. Additionally, the knowledge-graph system 104 may comprise a system of other devices. The techniques described herein are generally described with respect to a service provider system 102, such as a cloud provider network or system. However, the techniques are generally applicable for any network, such as on-premises networks, hybrid networks, and so forth.

As noted above, the service provider system 102 may be or include a cloud system that provides services and resources to fulfil computing resource needs of users 106, such as cloud-based computing resources. For instance, users 106 may operate the user devices 108 in order to register for use of the computing resources of the service provider system 102. The service provider system 102 may include a one or more managed services that include components to provide different types of automated, or semi-automated, services for users, such as the knowledge-graph system 104. Generally, the knowledge-graph system 104 may be, at least partly, control-plane systems that control operations occurring in the service provider system 102. The knowledge-graph system 104 may be either centralized, or distributed, and be supported by one or more computing devices.

In some instances, the knowledge-graph system 104, and the chatbot system 110, may be offered as a plugin for various applications, browsers, web-based services, web-based interfaces, and/or software agents. In some examples, the knowledge-graph system 104, and the chatbot system 110, may actually run locally on user devices and as an application on the device. The knowledge-graph system 104, and the chatbot system 110, may be packaged in a small enough software application to run locally on client devices. In some instances, the code of the knowledge-graph system 104, and the chatbot system 110, may be open source and hosted locally on user devices to provide the various functionality described herein. The knowledge-graph system 104, and the chatbot system 110, may behave as an LLM-based chatbot that interfaces with users 106 and runs locally on devices to provide various types of functionality (e.g., answers to queries and performing tasks on behalf of users such as scheduling, ordering items, etc.).

As illustrated, a service provider system 102 may be operated and/or managed by a service provider, such as a cloud provider. The service provider system 102 may provide various services to users to fulfil their computing resource needs, such as cloud-based computing resources. For example, the service provider system 102 may provide cloud-based, scalable, and network accessible compute power services, storage services, database services, and/or other services. Users 106 may utilize computing devices to subscribe for use of the computing resources and/or services provided by the service provider system 102.

A service provider system 102, often referred to as a cloud provider network or simply as a "cloud," refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A service provider system 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The service provider system 102 may deliver content from points of presence outside of, but networked with, these regions by way of edge locations and regional edge cache servers. This compartmentalization and geographic distribution of computing hardware enables the service provider system 102 to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The service provider system 102 may provide on-demand, scalable computing services to organizations through a network, for example allowing organizations to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows organizations to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the organizations, the hardware associated with the virtual computing devices can be scaled up or down depending upon the resources the organizations require. Organizations can choose to deploy their virtual computing systems to provide network-based services for their own use and/or for use by their users or client.

The service provider system 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by organizations of the service provider system 102, which may be provisioned in user accounts.

The service provider system 102 may offer many different built-in services to the organizations to help run their applications and services. For instance, the service provider system 102 may provide organizations with use of VPCs, which are logically isolated sections of the service provider system 102 that serve as private virtual environments to which only permitted accounts have access to use. Organizations may have multiple VPCs, potentially spanning across different regions of the service provider system 102. To help interconnect VPCs and other resources of the user's computing infrastructure, the service provider may also offer many different built-in networking services. The VPCs may be used by the organizations to create subnetworks, configure personalized route tables, choose IP addresses, monitor connections, screen network traffic, restrict access into the VPCs, and/or for other operations. As shown. The VPCs include or run computing resources, such as servers, virtual machines (VMs), containers, serverless functions, workloads, processes, etc. Generally, the computing resources are used to support or run applications or services of the organizations.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC is a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPv4 addresses for the VPC in the form of a Classless Inter-Domain Routing (CIDR) block. A VPC can span all of the availability zones in a particular region. After creating a VPC, a customer can add one or more subnets in each availability zone or edge location.

Users 106 desire to deploy and host applications in cloud systems, and want to maintain privacy as if the applications were running in on-premises networks. Accordingly, users 106 run their applications in VPCs and on computing resources of the service provider system 102. The computing resources may comprise any type of resource, such as CPU resources (e.g., server processors, virtual machines, containers, etc.), GPU resources, memory resources (e.g., random access memory, cache memory, etc.), storage (e.g., random operating memory (ROM), etc.), and networking resources.

Figure 2:
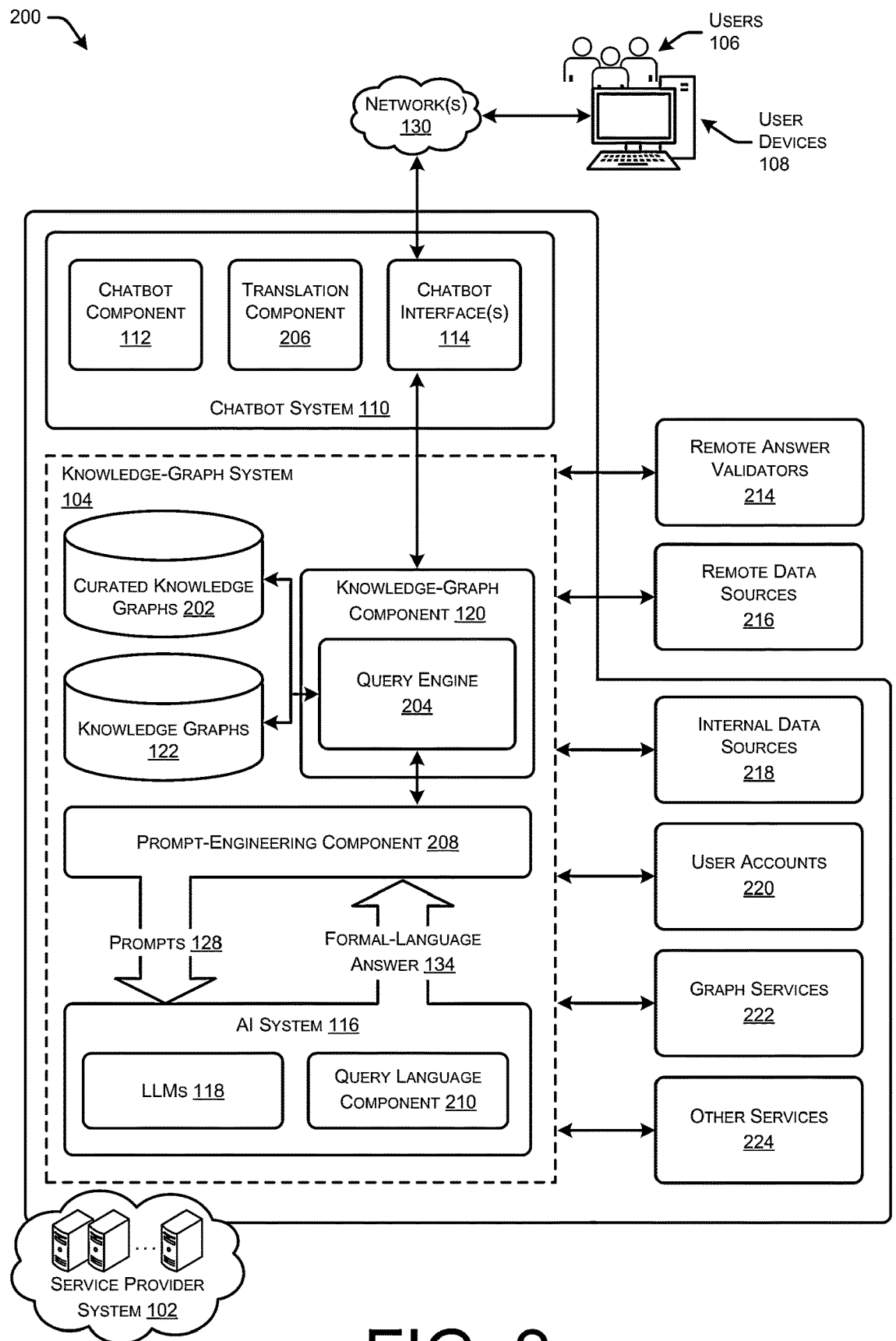
FIG. 2 illustrates a component diagram of example components of a service provider system that includes knowledge-graph system that generates knowledge graphs using LLMs.

FIG. 2 illustrates a component diagram 200 of example components of a service provider system 102 that includes knowledge-graph system 104 that generates knowledge graphs 122 using LLMs 118. As shown, the service provider system 102 may include the chatbot system 110 having the chatbot interfaces usable by users 106 to communicate with the chatbot system 110, such as chat interfaces (e.g., a user interface that allows users to interact with a system or application using natural language conversations), APIs (e.g., sets of rules and protocols that define how different software components can interact and communicate with each other), and CLIs (e.g., a text-based user interface that allows users 106 to interact with a computer program or operating system by typing commands into a command-line interpreter.)

The chatbot interfaces 114 may include a translation component 206 that is configured to translate between natural languages and formal query languages utilized by the knowledge-graph component 120 and the knowledge graphs 122. The knowledge-graph component 120 may include a query engine 204. Queries are generally written or expressed by users 106 in a natural language, and the query engine 204 may be used to convert the natural-language query 128 from the natural language and into a formal query language, such as an RDF query language or a SPARQL language. In some instances, the query engine 204 may harness a translation engine, such as another LLM, to convert the query into the query language. The query engine 204 may then evaluate the formal-language query 128 using the knowledge graph 122 and determine if the knowledge graph 122 returns results. In some instances, the knowledge-graph system 104 may further include curated knowledge graphs 202 that may be used in conjunction with the knowledge graphs 122 to answer queries 128. The curated knowledge graphs 202 may be configured or built to answer questions that are specific to a particular subject-matter domain, and the query engine 204 may determine to use the curated knowledge graphs 202 for queries 128 that are semantically related to those domains. However, in examples where the query engine is unable to identify an answer 134 for the query 128 using the knowledge graphs 122 and/or curated knowledge graphs 202, the knowledge-graph component 120 pass the query 128 to a prompt-engineering component 208.

In some instances, the curated knowledge graphs 202 may be provided by users 106 that have previously been built or acquired by the users 106. Generally, the knowledge graphs 122 and curated knowledge graphs 202 may be graph-like data structures with nodes, edges, attributes, and labels. Nodes in the graphs 122/202 represent entities or concepts (e.g., people places, objects, etc.), the edges represents relationships between the nodes, the attributes provide additional metadata or information about entities or relationships, and the labels can be attached to nodes and edges to indicate a kind of the entity or relationship being represented. Generally, individual words have their own nodes, and statements are edges in a graph that connect multiple nodes. For instance, the expression "Fred was born in Germany" has the subject of "Fred," the predicate of "birthplace," and the object of "Germany." In this example, the "birthplace" is an edge in a graph 122/202 and the words "Fred" and "Germany" may be nodes that are connected by the edge, "birthplace." This is an example of a triplet that may be expressed in the graphs 122/202. In some instances, metadata may be attached to the subject, predicate, and/or object, such as in the form of a label or attribute. The label/attribute may be associated with every expression in which the associated item is included. As described in more detail below, the provenance data that indicates sources of the answers may be attached to the nodes and/or edges that are included in the expression of the answer. In this way, when an answer is selected for a query, the provenance information indicating source(s) of that answer may be provided to a user 106 to indicate the source of the answers.

The query engine 204 may utilize various techniques to identify relevant information from the knowledge graphs 202/122 using one or more techniques to identify one or more nodes that have relevant information for the formal-language queries 128. The query engine 204 may utilize graph traversal algorithms, such as Depth-First Search (DFS) and Breadth-First Search (BFS), to traverse the nodes and edges of the knowledge graphs 202/122 and explore the graph structure to find relevant nodes and relationships. The query engine 204 may utilize pattern matching techniques to find subgraphs that match the structure specified in the formal-language query 128, which may involve identifying nodes and edges that fit the query pattern. As explained herein, the query engine 204 may utilize SPARQL (SPARQL Protocol and RDF Query Language) as a query language because SPARQL is a query language specifically designed for querying RDF (Resource Description Framework) data, which may be used to retrieve specific patterns or information from the knowledge graphs 122/202. The query engine 204 may utilize SPARQL queries to retrieve specific patterns or information from the graph. The query engine may additionally use techniques such as indexing and optimization using data structures in the knowledge graphs 202/122 that allow for faster lookup and retrieval of information, and inference and reasoning for knowledge graphs 122/202 that contain implicit information that can be inferred based on explicit facts (e.g., deduce additional information from the graph based on logical rules). The query engine 204 may utilize semantic similarity and similarity metrics as well for formal-language queries 128 that may require finding nodes or edges that are similar to a given entity. The query engine 202 may use similarity metrics, such as cosine similarity or Jaccard index, to measure the similarity between nodes in the knowledge graphs 122/202 to identify semantic similarities. The query engine 204 may utilize various statistical methods to estimate the likelihood of certain patterns occurring in the knowledge graphs 122/202, as well as heuristic approaches to guide the search for relevant information. The heuristics are rules of thumb that can help the query engine 204 prune the search space and focus on potentially relevant parts of the graph.

The query engine 204 may identify relevant nodes in the knowledge graphs 122/202 as answers to a given query. The query engine 204 (and/or the chatbot system 110) may utilize retrieval augmented generation (RAG) to determine the answer provided by the information stored in the knowledge graphs 122/202. RAG is an AI framework for retrieving facts from an external knowledge base to ground language models on the most accurate, up-to-date information and to give users insight into LLMs' generative process. RAG is an approach in natural language processing (NLP) that combines a retrieval-based system and a generative model. The RAG approach aims to enhance the capabilities of generative models by incorporating information retrieval techniques. The retrieval-based techniques include techniques for finding relevant information from the knowledge graphs 122/202. The retrieval techniques may include various techniques, such as keyword matching, TF-IDF (Term Frequency-Inverse Document Frequency), or more advanced methods like dense vector search (using models like BERT, Sentence Transformers, etc.) to retrieve relevant information. The generative techniques often include a generative model, such as a language model capable of generating human-like text. The generative models used are powerful in generating coherent and contextually relevant text, but they may not always have access to specific information or facts. The query engine 204 may integrate the retrieved information from the knowledge graphs 122/202 to provide context or augment the generative model's responses. The integration can be done in various ways, such as concatenating the retrieved information with the input prompt, using it as a context window, or employing attention mechanisms to focus on specific parts of the retrieved content. The query engine 204 may then generate output using combined input (original prompt+retrieved information) that is passed to the generative model, and the model then generates a response based on this augmented input. The query engine 204 and/or chatbot system 110 utilizes RAG to provide answers to queries and strikes a balance between the strengths of generative models (creative text generation) and retrieval-based systems (access to specific information). By combining these components, the query engine 204 and/or chatbot system 110 aims to produce responses that are both contextually relevant and factually accurate.

The query engine 204 and/or chatbot system 110 may utilize RAG to generate a response that is still in the same tone as the rest of its conversation with the user 106, but which is more likely to be grounded in fact, and because it allows the language model to generate a natural sounding response based on multiple pieces of information drawn from the knowledge graphs 122/202.

Further, a prompt-engineering component 208 may perform various prompt engineering techniques. For instance, the prompt-engineering component 208 may provide the LLM 118 with a portion of the knowledge graph 122, such as the most relevant information for the formal-language query 128. For example, the query engine 204 may determine which portion of the knowledge graph 122 is semantically most relevant, or has answers that are relevant for the formal-language query 128. The prompt-engineering component 208 may then provide the most relevant information along with the formal-language query 128 to the LLM 118 in one or more prompts 132. Further, rather than providing the relevant information in the language or structure of the knowledge graph (e.g., semantic triples, RDF triples, etc.), the prompt-engineering component 208 may generate a summary (potentially harnessing an LLM) of the relevant information to reduce the amount of data provided to the LLM 118.

Generally, the prompts 128 may be in a format that is understood by the LLMs 118. For instance, the prompt 128 may include text such as "Answer the following query: 'List the U.S. Presidents who were born during the baby boomer generation, and their birth dates' and use the following information from the knowledge graph to determine the answer [Knowledge graph information]." The LLM 118 may initially analyze the prompt 128, particularly the knowledge graph information (which may be in the formal language) to determine if the prompt 128 fits within the context window size of the LLM 118, and perform techniques described herein based on the prompt 128 being too large for the context window size (e.g., summarizing the prompt 128, providing only the most relevant information, etc.), or may analyze the prompt 128 using the LLM 118 if the prompt 128 fits in the context window size.

The AI system 116 may, in addition to the LLMs 118, include a query-language component 210 configured to translate back-and-forth between natural languages and query languages based on the inputs and outputs communicated with the prompt-engineering component 208. For instance, the prompts 132 may include formal-language queries 128, natural-language queries 126, and/or a combination thereof, and the query-language component 210 may translate the queries when analyzing the queries to determine answers.

The service provider system 102 may additionally include various services and data structures, and may communicate with various remote or external services or data structures. For instance, the service provider system 102 may include internal data sources 218 (e.g., service documentation) usable to improve the knowledge graphs 122. The internal data sources 218 may include data provided by users 106, documentation generated by the service provider, and/or other information.

To utilize the services provided by the service provider system 102, the users may register for user accounts 220 with the service provider system 102. For instance, users may utilize a user device to interact with an identity and access management (IAM) component that allows the users to create user accounts 220 with the service provider system 102. The service provider system 102 may further provide and store user accounts 220 through which users 106 may interact with the service provider system 102 and improve knowledge graphs 122 that are being generated on their behalf. Generally, the IAM component may enable the users 106 to manage their network infrastructures remotely, and view data provided by the knowledge-graph system 104. Generally, the different user accounts 220 can assume different roles, or sets or permissions/credentials, that allow users to perform different actions, and be restricted from performing some actions. In some instances, a same organization may have multiple accounts that have different network infrastructures.

The service provider system 102 may additionally include one or more graph services 222 that assist in the creation, development, and maintenance of knowledge graphs 122. These graph services 222 may perform various activities from data acquisition and cleaning to designing the schema, linking entities, and setting up the infrastructure for knowledge graph storage and querying. The graph services 222 may work with the knowledge-graph system 104 to create knowledge graphs 122, potentially without the need of data sets, as described herein.

The service provider system 102 may include various other services 224 that interact with, or utilize, the knowledge-graph system 104. For instance, the other services 224 may provide chatbots that help users with their various functionalities. The other services 224 may utilize the knowledge-graph system 104 to build respective knowledge graphs 122 that improve the chatbots utilized by those other services 224.

As described herein, the service provider system 102 may include one or more hardware processors (processors), one or more devices, configured to execute one or more stored instructions. The processor(s) may comprise one or more cores. Further, the service provider system 102 may include one or more network interfaces configured to provide communications between the service provider system 102 and other devices, such as the user device(s), and/or other systems or devices in the service provider system 102 and/or remote from the service provider system 102. The network interfaces may include devices configured to couple to personal area networks (PANs), wired and wireless local area networks (LANs), wired and wireless wide area networks (WANs), and so forth.

The service provider system 102 may also include computer-readable media that stores various executable components (e.g., software-based components, firmware-based components, etc.). In addition to various components discussed in the previous figures, the computer-readable-media may further store components to implement functionality described herein. While not illustrated, the computer-readable media may store one or more operating systems utilized to control the operation of the one or more devices that comprise the service provider system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider system 102 may include a data store, or storage, which may comprise one, or multiple, repositories or other storage locations for persistently storing and managing collections of data such as databases, simple files, binary, and/or any other data. The storage may include one or more storage locations that may be managed by one or more database management systems.

To utilize the services provided by the service provider system 102, the users may register for accounts with the service provider system 102. For instance, users may utilize a user device to interact with an identity and access management (IAM) component that allows the users to create user accounts with the service provider system 102. Generally, the IAM component may enable the users to manage their network infrastructures remotely, and view data provided by the knowledge-graph system 104. Generally, the different user accounts can assume different roles, or sets or permissions/credentials, that allow users to perform different actions, and be restricted from performing some actions. In some instances, a same organization may have multiple accounts that have different network infrastructures.

The computer-readable media may be used to store and retrieve information, such as program modules, data structures, or other data. It should be appreciated by those skilled in the art that computer-readable storage media is any available media that provides for the non-transitory storage of data and that can be accessed by the service provider system 102. In some examples, the operations performed by the service provider system 102, and or any components included therein, may be supported by one or more server devices. Stated otherwise, some or all of the operations performed by the service provider system 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
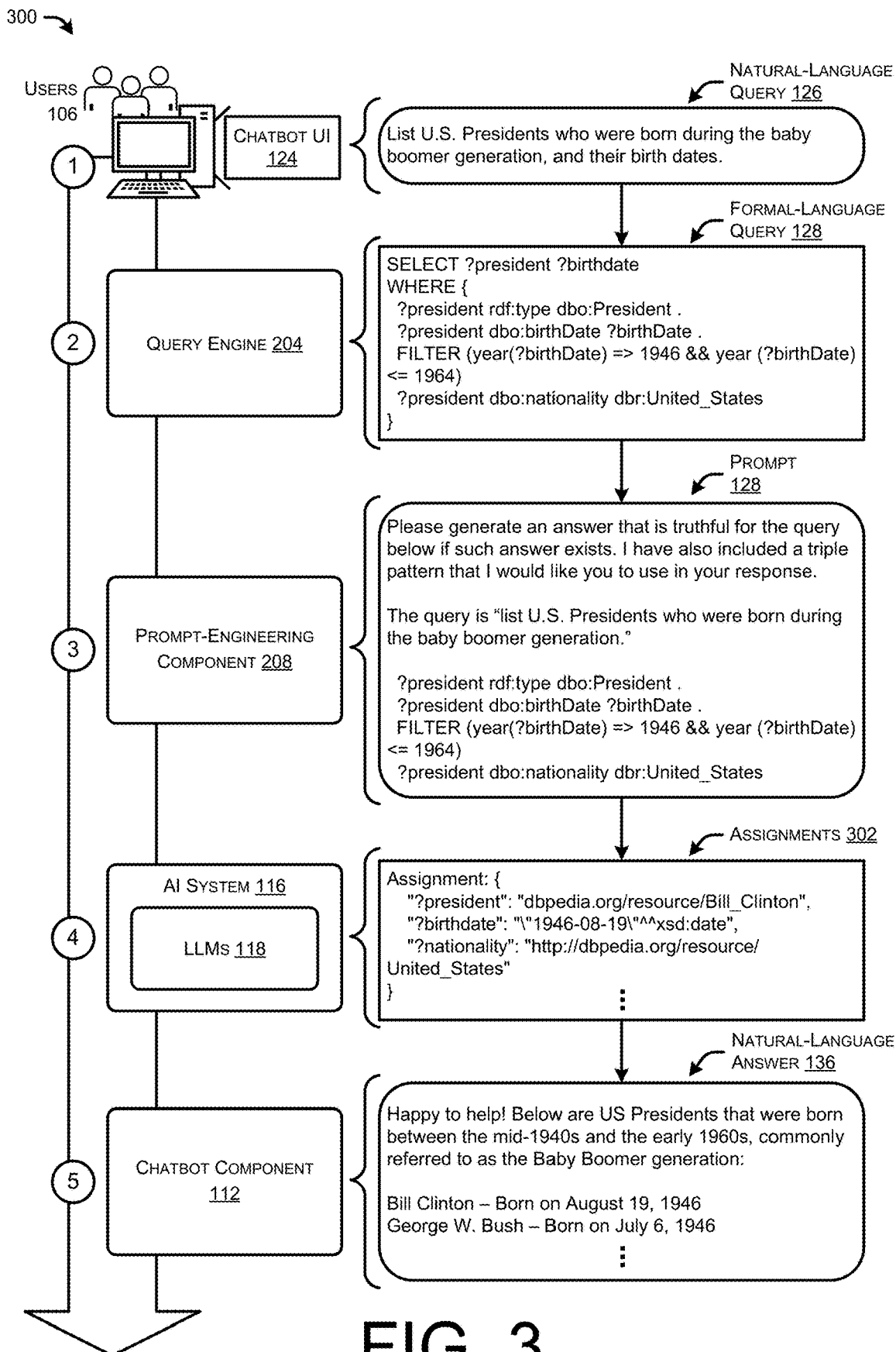
FIG. 3 illustrates an example timeline flow according to which a query passes through a processing pipeline including the use of a knowledge graph and LLM to determine an answer to the query.

FIG. 3 illustrates an example timeline flow 300 according to which a query passes through a processing pipeline including the use of a knowledge graph 122 and LLM 118 to determine an answer to the query.

Initially, a user 106 may submit a natural-language query 126 through the chatbot UI 124 and via a user device 108. In this particular example, the use 106 is asking about United States (U.S.) Presidents, which of them were born during the Baby Boomer generation, and what their birthdates are.

The natural-language query 128 may be translated by the chatbot system 110 using one or more translation LLMs, and then be provided to the query engine 204. The translation LLMs (e.g., translation component 206) may translate the natural-language query 128 from the natural-language query 126 and into the query-language query 128. The formal-language query 128 may be usable to query the knowledge graphs 122 for an answer 134.

In instances, where the knowledge graphs 122 do not return an answer 134 for the formal-language query 128, the prompt-engineering component 208 may then generate a prompt 132 for the LLM 118. As shown, the prompt 132 may include a request that the LLM 118 generate a truthful answer for the query 128, may include the natural-language query 126, and may further include one or more triple patterns (e.g., a list of triples where some elements are variables). The prompt-engineering component 208 may then generate the prompt 132 that consists of this particular triple pattern and instructions about how to evaluate it. The prompt-engineering component 208 may also include some additional information in the prompt to help improve the accuracy of the LLM's response, including the initial (plain-language) question that is being answered, and inferred types of each variable.

The LLM 118 may then response with a list of assignments 302 to each variable in the triple pattern. In some examples, the prompt-engineering component 208 may iteratively ask the LLM 118 to produce further assignments 302, until it responds that no more assignments 302 are possible. The prompt-engineering component 208 might face context window limitations—as the list of solutions that have already been produced grows, the length of the prompt 132 increases (although this list will be much smaller than the size of the generated knowledge graph 122 as a whole). Accordingly, the prompt-engineering component 208 may replace parts of the solution list with (LLM-inferred) summaries. The chatbot component 112 may obtain these assignments 302 and generate a natural-language answer 136 for the chatbot interface 114 to output.

Figure 4A:
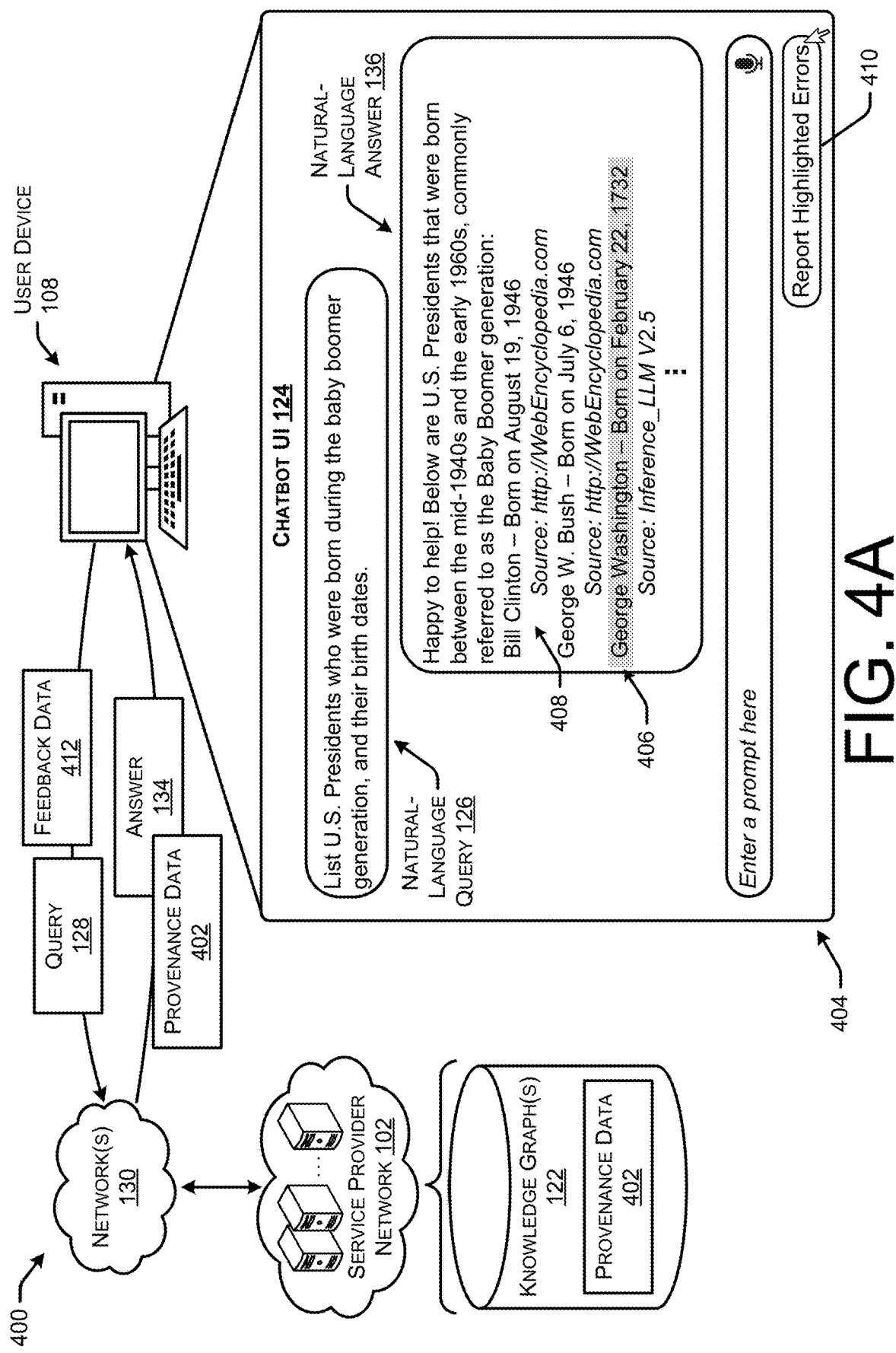
FIG. 4A illustrates an example interface through which a chatbot system presents provenance data for answers to queries, and prompts a user to report any errors in the answers.

FIG. 4A illustrates an example interface 404 through which a chatbot system 110 presents provenance data 402 for answers to queries, and prompts a user 106 to report any errors in the natural-language answers 136.

In some instances, the use 106 may, via the chatbot UI 124, request that the chatbot system 110 provide provenance data 402. The chatbot system 110 may be able to work with the knowledge-graph component 120 to provide the provenance data 402 for the answers 134 to the queries 128. The provenance data 402 may be stored in the knowledge graphs 122 and be associated or mapped to the answers, such as by using labels or other metadata that are assigned to nodes and/or edges. The provenance data 402 may indicate the origin or source of the natural-language answer 136, such as a URL for the data source, a name of the entity that provided the natural-language answer 136, and so forth. The knowledge-graph system 104 may store the provenance data 402 in the knowledge graph 122 and mapped to the natural-language answers 136. In this way, if the user 106 requests that the chatbot system 110 provide an indication of the source of the natural-language answer 136, the chatbot system 110 may work with the knowledge-graph system 104 to obtain the provenance data 402 for the answer 136 (or answers 136) and provide that information to the user 106 via the chatbot UI 124. The user 106 can then decide whether they trust the source of the natural-language answer 136, and follow up to confirm the natural-language answer 136 on their own.

Further, the chatbot UI 124 may include or expose a feedback mechanism, such as a report-highlighted-errors option 410, through which users 106 are able to provide feedback regarding the accuracy of an answer provided by the chatbot. In this example, the user 106 may be able to highlight a portion of the natural-language answer 136 that is an incorrect portion 406, or simply flag the entire answer, and being incorrect or confusing. The feedback data 412 may be provided to the knowledge-graph component 120 and used to improve the knowledge graph 122.

Figure 4B:
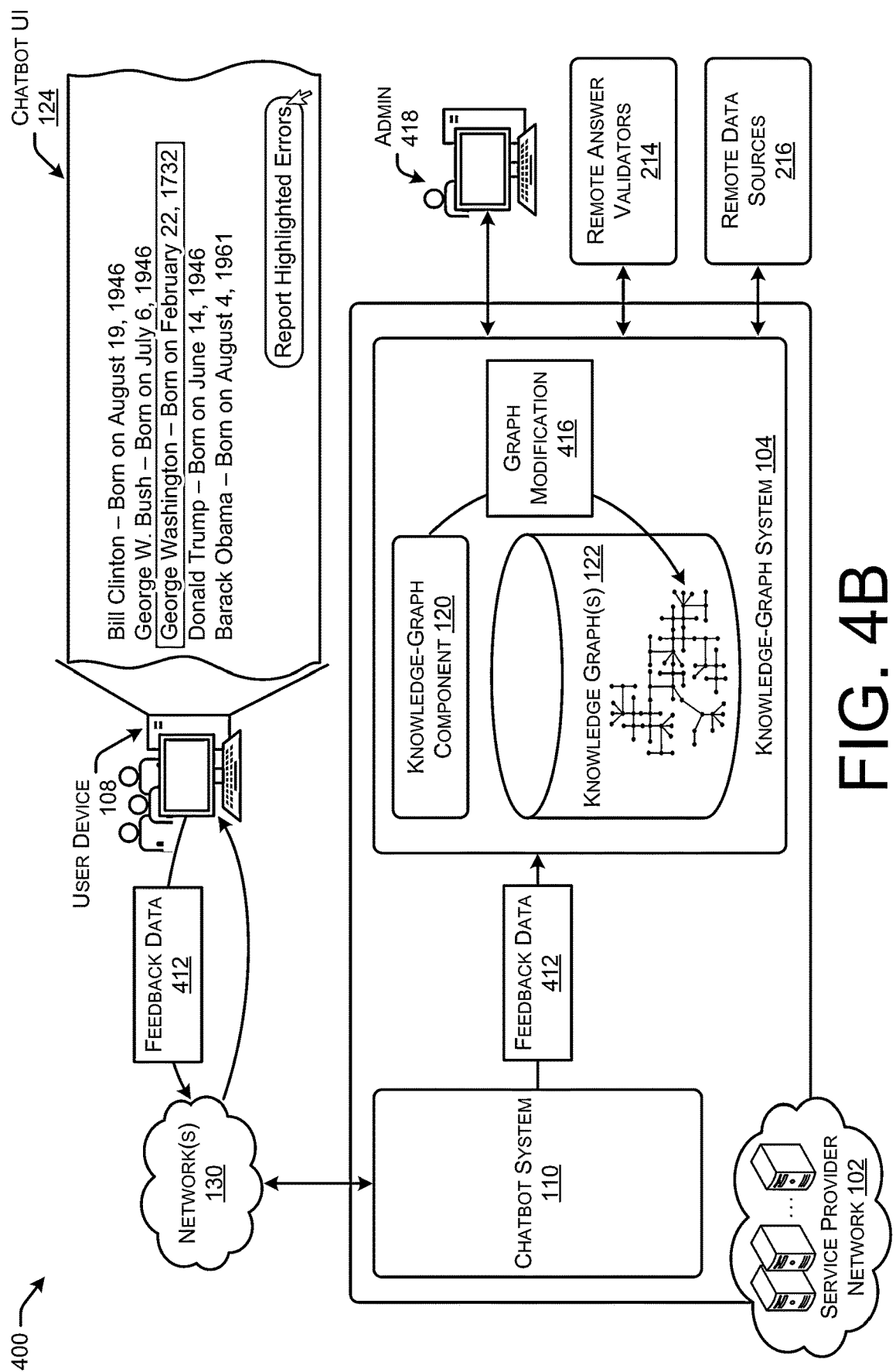
FIG. 4B illustrates an example system-architecture diagram where a chatbot system provides user feedback for an answer, and a knowledge-graph system that modifies a knowledge graph used to determine the answer based on the feedback.

FIG. 4B illustrates the example system-architecture diagram 400 where the chatbot system 110 provides feedback data 412 for an answer 134, and a knowledge-graph system 104 that modifies a knowledge graph 122 used to determine the answer 134 based on the feedback data 412.

The user 106 may select the report-highlighted-errors option 410, and feedback data 412 may be provided to the knowledge-graph system 102. The knowledge-graph component 120, and/or an administrator (admin 418) associated with the knowledge-graph system 104, may determine whether the answer 134 is accurate, either modify or remove the answer 134 if it is determined to be inaccurate or confusing. In some instances, remote answer validators 214 (e.g., external LLMs, external subject matter experts, etc.), and/or remote data sources 216 (e.g., web-based encyclopedias, user forums, etc.), may be used to determine whether the answer 134 is accurate, either modify or remove the answer 134 if it is determined to be inaccurate or confusing. In this example, the knowledge-graph component 120 may determine, or receive input from the other sources, that the answer 134 is inaccurate or confusing, and may perform a graph modification 416 to change, modify, or remove the answer 134 and improve the knowledge graph 122.

Figure 5:
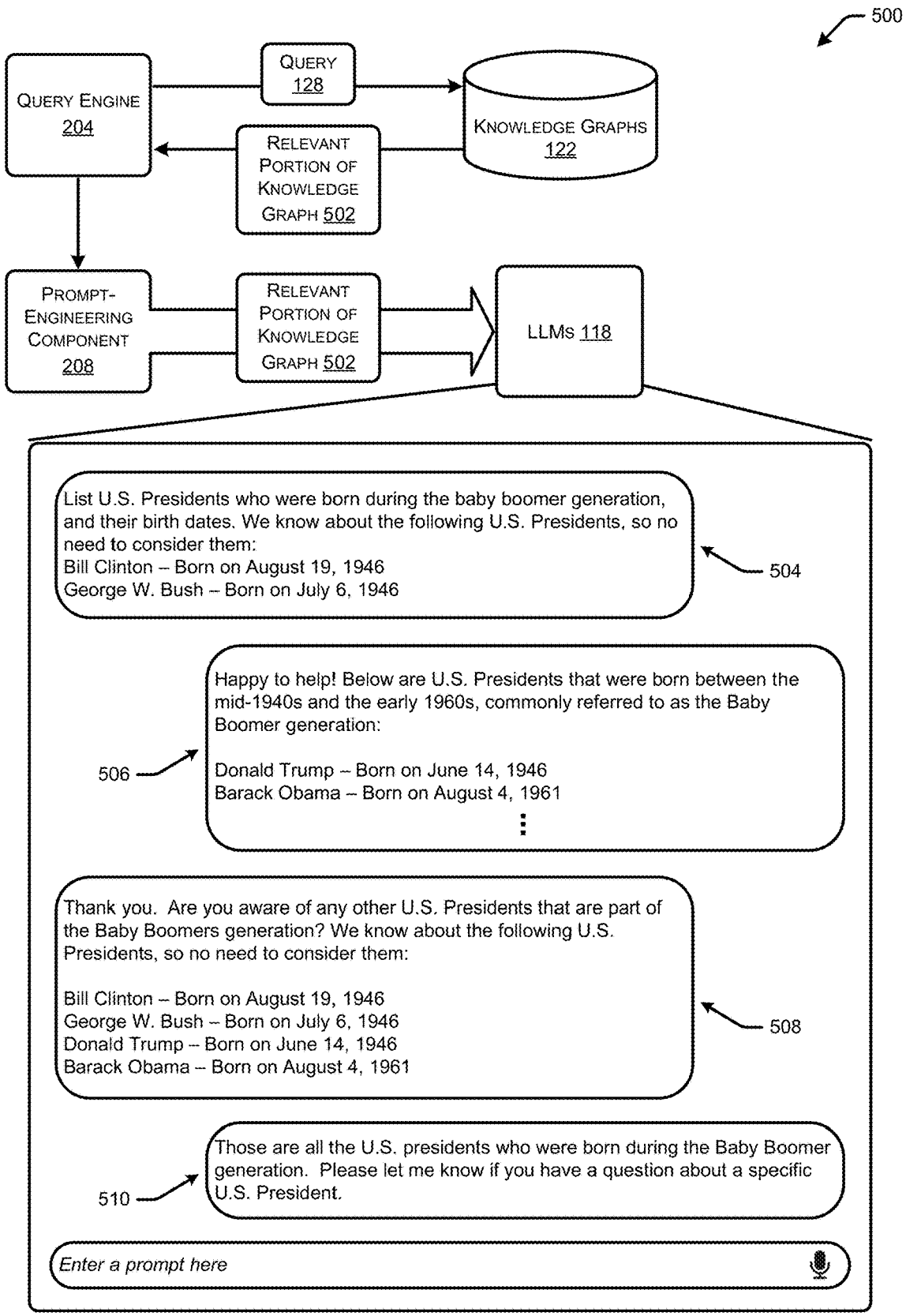
FIG. 5 illustrates an example system-architecture diagram of an example interface through which a prompt-engineering component provides a relevant portion of a knowledge graph to an LLM in order to help determine an answer to a query.

FIG. 5 illustrates an example system-architecture diagram of an example interface 500 through which a prompt-engineering component 208 provides a relevant portion of a knowledge graph 502 (or relevant portion 502) to an LLM 118 in order to help determine an answer to a query 128.

To handle the context window limitations, the prompt-engineering component 208 may provide the LLM 118 with the most relevant information for the query 128. For example, the prompt-engineering component 208 may determine which portion of the knowledge graph 122 is semantically most relevant, or has answers that are relevant for the query. The prompt-engineering component 208 may then provide the relevant portion 502 along with the query 128 to the LLM 118.

As shown, the prompt 504 includes the query 128, and also some information or answers 134 already contained in the knowledge graphs 112. The response 506 from the LLM 118 may include some additional answers 134 for the query 128. The prompt-engineering component 208 may continue to iteratively prompt the LLM 118 until the LLM 118 no longer has any more answers 134. As shown in prompt 508, the prompt-engineering component 208 again asks for additional answers 134, and provides the known answers 134 for the query 128. The LLM 118 may provide a response 510 that indicates it provided all of the information it had related to the query 128.

Figure 6:
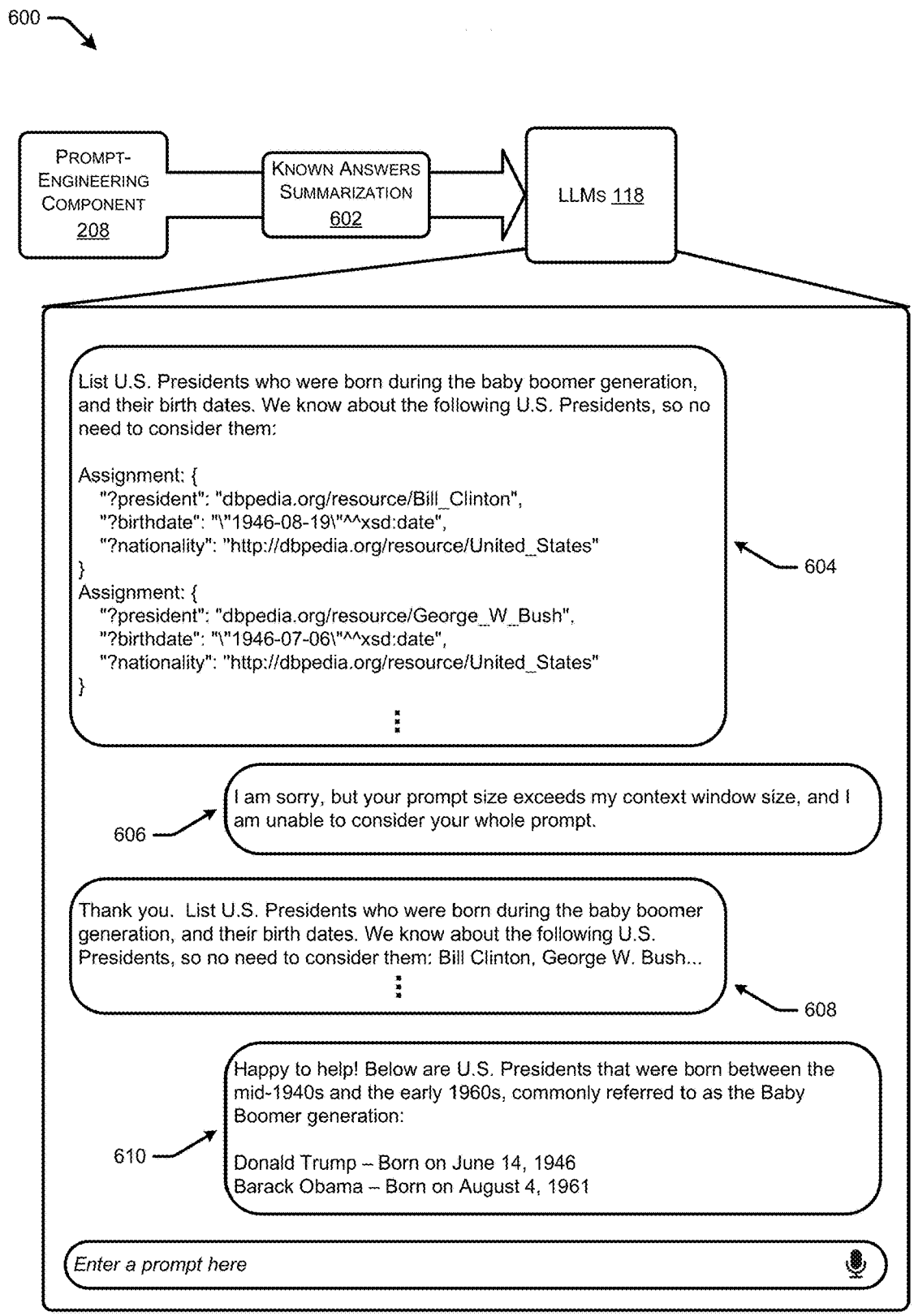
FIG. 6 illustrates an example interface through which a prompt-engineering component summarizes an initial prompt to generate a summarized prompt that fits within a context window of an LLM-backed chatbot.

FIG. 6 illustrates an example interface 600 through which a prompt-engineering component 208 summarizes an initial prompt 604 to generate a summarized prompt 608 that fits within a context window of an LLM 118.

In the initial prompt 604, the prompt-engineering component 208 may include the query 128 in the natural language, and also the assignments 302 that have been determined and stored in the knowledge graph 122. The response 606 provided by the LLM 118 indicates that the initial prompt 604 exceeds the context window size for the LLM 118. Accordingly, the prompt-engineering component 208 may generate a summary (potentially harnessing an LLM) of the assignments 302 and/or other data in the initial prompt to generate the prompt 608. The LLM 118 is then able to provide a response 610 that includes the answers 134 that were desired by the prompt-engineering component 208.

In some instances, the interfaces 500 and 600 may be a chat interface through which users and/or programs are able to submit text (and other input) prompts. However, in some examples the interfaces 500 and 600 may be any type of interfaces through which software, such as the prompt-engineering component 208, can communicate with the LLMs 118, such as CLIs, APIs, or any other type of software instructions. Thus, although some of the examples described and/or illustrated herein are shown with the interfaces 500 and 600 being a chat interface, those are merely for illustrative purposes and the interfaces 500 and 600 may comprise any type of software interface through which the prompt-engineering component 208 (and/or users 106) can use to interface with the LLMs.

FIGS. 7, 8, 9, 10A-10B, and 11 illustrate flow diagrams of example processes 700, 800, 900, 1000, and 1100 that illustrate aspects of the functions performed at least partly by the service provider system 102 as described in this disclosure. The logical operations described herein with respect to FIGS. 7, 8, 9, 10A-10B, and 11 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7, 8, 9, 10A-10B, and 11 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7:
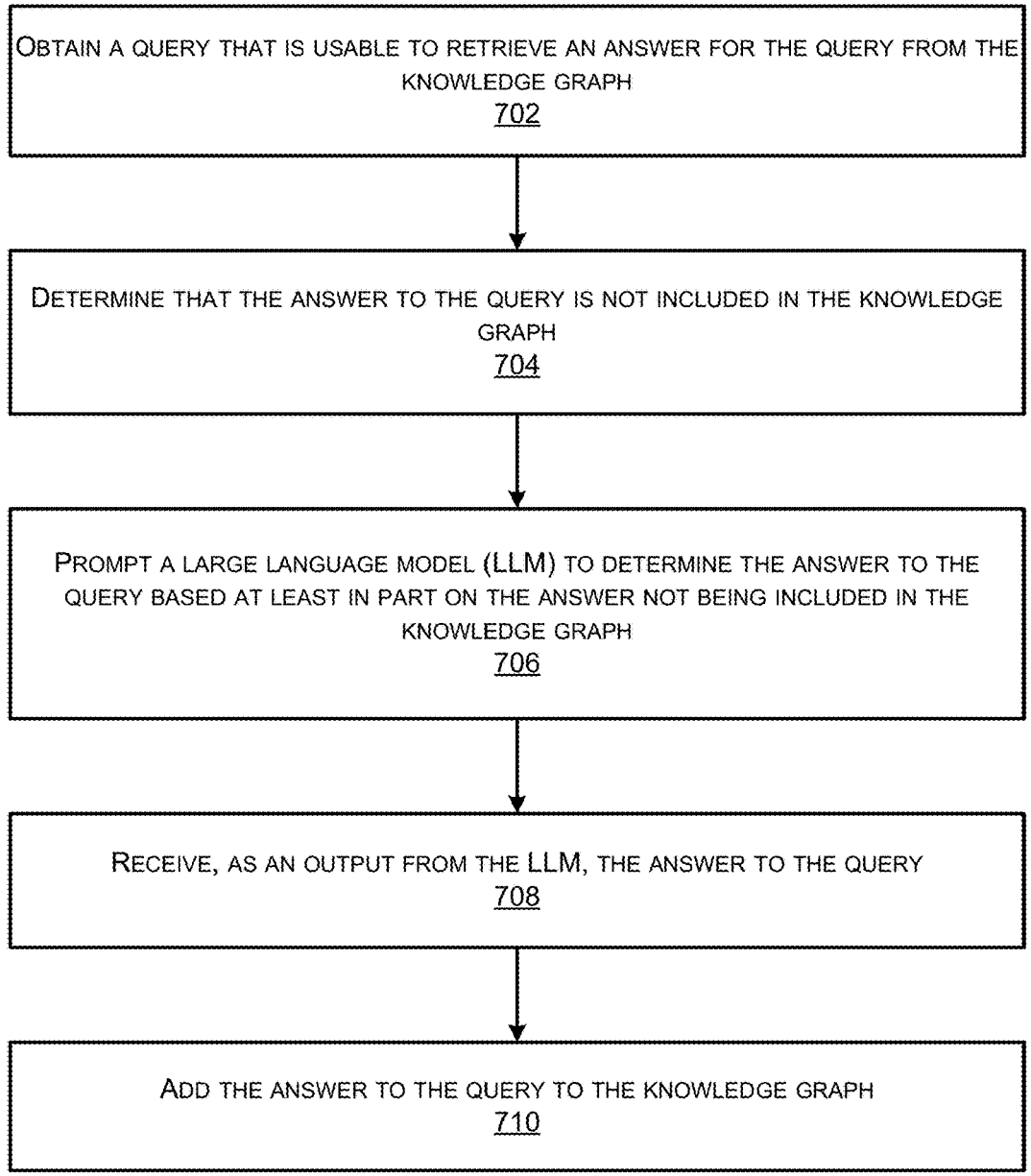
FIG. 7 illustrates a flow diagram of an example process for a knowledge-graph system to use an LLM to determine an answer for a query, and add the answer for the query to a knowledge graph.

FIG. 7 illustrates a flow diagram of an example process 700 for a knowledge-graph system 104 to use an LLM 118 to determine an answer for a query, and add the answer for the query to a knowledge graph.

At 702, the knowledge-graph system 104 may obtain, and/or generate, a formal-language query 128 that is usable to retrieve a formal-language answer from the knowledge graph. The knowledge-graph system 104 may receive a natural-language query 126 via a chatbot system 110 and from a user 106, and in some instances, the knowledge-graph system 104 may instruct one or more LLMs 118 to determine queries and answers for the queries to build a knowledge graph 122. As another example, the knowledge-graph system 104 may obtain a dataset including a plurality of queries related to one or more subject matter domain areas, and iteratively prompt the LLMs 118 to determine formal-language answers 134 usable to generate the knowledge graph 122.

At 704, the knowledge-graph system 104 may determine, by a query engine 204, that the formal-language answer 134 to the formal-language query 128 is not included in the knowledge graph 122. For instance, the query engine 204 associated with the knowledge-graph system 104 may query the knowledge graph 122 to identify the formal-language answer 134 to the formal-language query 128 and determine the formal-language answer 134 is not included therein.

At 706, the knowledge-graph system 104 may, based at least in part on the formal-language answer 134 not being included in the knowledge graph 122, prompt a large language model (LLM) 118 to determine the answer to the formal-language query 128. For instance, the knowledge-graph component 120 may generate a prompt 132 for the LLM 118 that includes the natural-language query 126, the formal-language query 128, and/or a combination thereof (and potentially a relevant portion of the knowledge graph 502 and/or a known answers summarization 602). In some instances, knowledge-graph system 104 may identify a portion of the knowledge graph 122 that includes information that is relevant to the formal-language query 128, and generate a prompt 132 for the LLM 118 to determine the formal-language answer 134 to the formal-language query 128 where the prompt 132 includes the portion of the knowledge graph 122 and the formal-language query 128.

At 708, the knowledge-graph system 104 may receive, as an output from the LLM 118, the formal-language answer 136 to the formal-language query 128. At 710, the knowledge-graph system 104 may add the formal-language answer 134 to the knowledge graph 122 as a formal answer to the formal-language query 128, and/or may modify an answer in the knowledge graph 122 using the output.

In some instances, the process 700 may further include receiving feedback data 412 indicating that the answer is an incorrect answer to the query, and at least one of modifying the answer in the knowledge graph or removing the answer from the knowledge graph.

In some instances, the process 700 may further include identifying a portion of the knowledge graph that includes information relevant to the query, and generating a prompt for the LLM to determine the answer to the query, the prompt including the portion of the knowledge graph and the query, where prompting the LLM to determine the answer includes providing the prompt to the LLM.

In some instances, the process 700 may further include prompting the LLM to determine a second answer to the query, receiving, as a second output from the LLM, the second answer to the query, generating, using first answer and the second answer in the natural language, a summary of known answers to the query, wherein the summary of the known answers comprises an amount of data that is less than a context window of the LLM, and prompting the LLM to determine a third answer to the query, the prompting including providing the LLM with the summary of the known answers.

Figure 8:
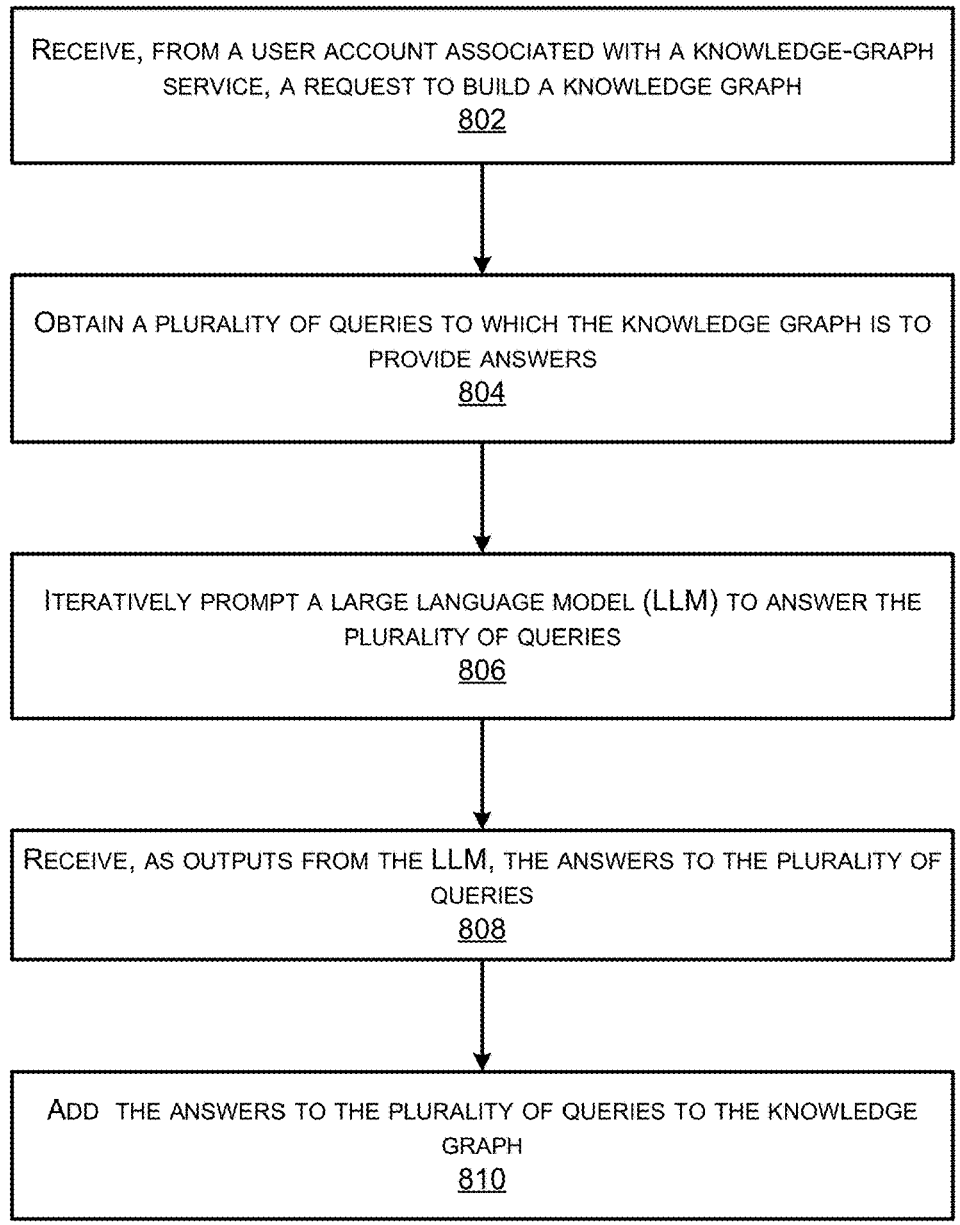
FIG. 8 illustrates a flow diagram of an example process for a knowledge-graph system to iteratively prompt an LLM to determine answers for a plurality of queries, and build a knowledge graph by adding the answers for the queries to the knowledge graph.

FIG. 8 illustrates a flow diagram of an example process 800 for a knowledge-graph system 104 to iteratively prompt an LLM 118 to determine answers for a plurality of queries, and build a knowledge graph 122 by adding the answers for the queries to the knowledge graph 122.

At 802, the knowledge-graph system 104 may receive a request to build a knowledge graph 122. In some instances, the request may come from a user account 220 that is registered with a graph service 222 that desires to build a knowledge graph 122 around one or more subject matter areas.

At 804, the knowledge-graph system 104 may obtain a plurality of queries to which the knowledge graph 122 is to provide answers. For instance, the knowledge-graph system 104 may obtain the plurality of queries from a frequently asked questions (FAQ) database, from a customer help forum, or the like. In some instances, however, the knowledge-graph system 104 may simply ask the LLM 118 to build a knowledge graph 122 around one or more subject matter areas by continuing to iterate around those knowledge areas.

At 806, the knowledge-graph system 104 may iteratively prompt an LLM 118 to answer the plurality of queries. For instance, a prompt-engineering component 208 may continue to prompt the LLM 118 for answers to queries.

At 808, the knowledge-graph system 104 may receive, as outputs from the LLM, the answers to the plurality of queries. For instance, the LLM 118 may continue to output answers to the queries presented by the prompt-engineering component 208.

At 810, the knowledge-graph system 104 may add the answers to the plurality of queries to the knowledge graph 122. In this way, the LLM 118 may build or generate a knowledge graph 122 through prompt engineering.

Figure 9:
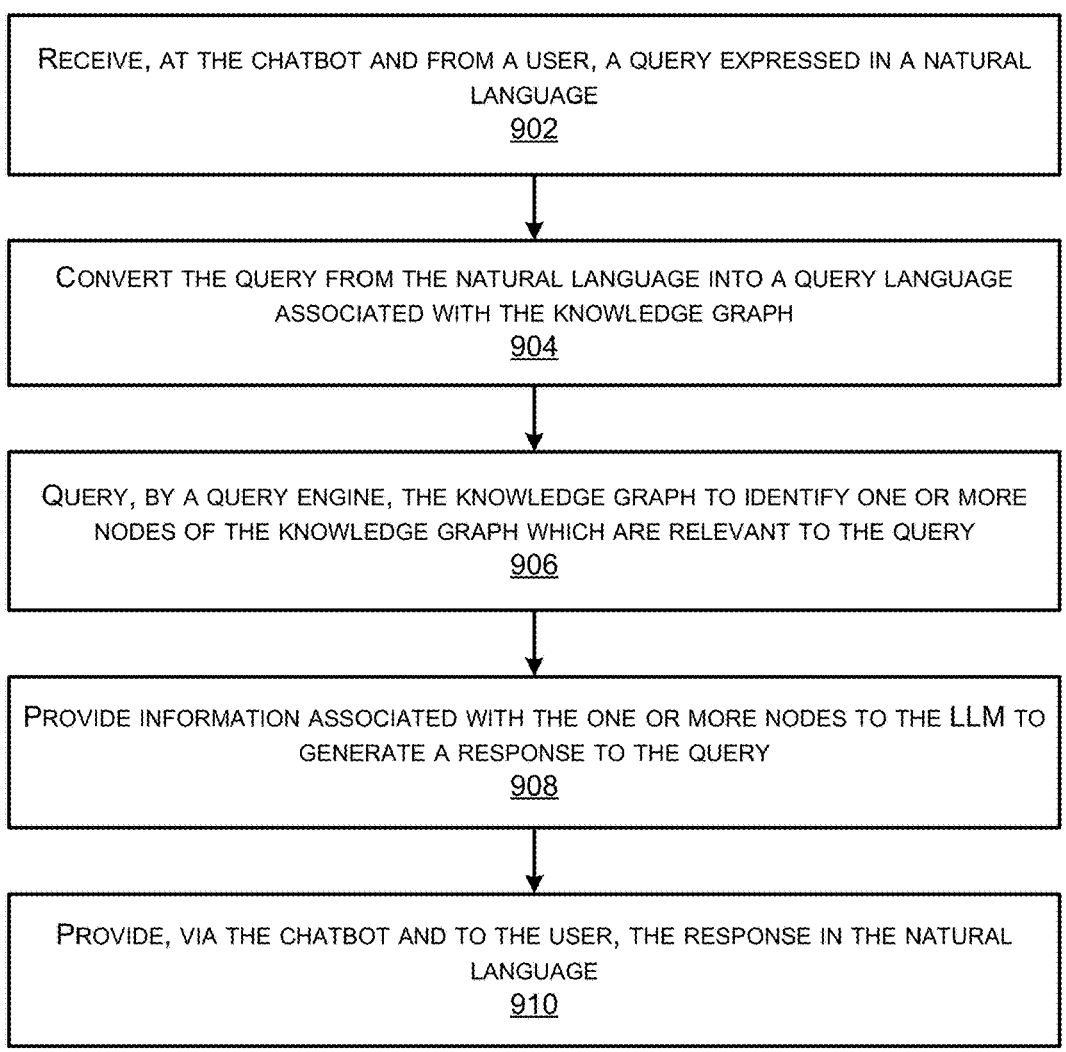
FIG. 9 illustrates a flow diagram of an example process for a chatbot to receive a query in a natural language, convert it into a query language, and determine that the knowledge graph does not have an answer for the query. The chatbot then uses an LLM to determine the answer, adds it to the knowledge graph, and provides the answer to the user.

FIG. 9 illustrates a flow diagram of an example process 900 for a chatbot system 110 to receive a query in a natural language, convert it into a query language, and determine that the knowledge graph 122 does not have an answer for the query. The chatbot system 110 then uses an LLM 118 to determine the answer, adds it to the knowledge graph 112, and provides the answer to the user 106.

At 902, the chatbot system 110 may receive, from a user 106, a query for which the chatbot system 110 is to provide an answer. In such examples, the query may be expressed in a natural language presented by a user 106.

At 904, the chatbot system 110 may convert the query from the natural language into a query language associated with the knowledge graph. For instance, the chatbot system 110 may include a translation component (e.g., LLM or other AI model) that translates natural language text into formal/query language text.

At 906, a query engine may query the knowledge graph to identify the answer to the query. For instance, the query engine 204 associated with the knowledge-graph system 104 may query the knowledge graph 122 to identify the formal-language answer 134 to the formal-language query 128 and determine the formal-language answer 134 is not included therein.

In some instances, the query engine may determine that the knowledge graph does not include the answer to the query, and a knowledge-graph component 120 may prompt the LLM to determine the answer to the query. For instance, the knowledge-graph component 120 may generate a prompt 132 for the LLM 118 that includes the natural-language query 126, the formal-language query 128, and/or a combination thereof (and potentially a relevant portion of the knowledge graph 502 and/or a known answers summarization 602). In some instances, knowledge-graph system 104 may identify a portion of the knowledge graph 122 that includes information that is relevant to the formal-language query 128, and generate a prompt 132 for the LLM 118 to determine the formal-language answer 134 to the formal-language query 128 where the prompt 132 includes the portion of the knowledge graph 122 and the formal-language query 128.

At 908, the knowledge-graph component 120 may provide information associated with the one or more nodes to the LLM to generate a response to the query. The knowledge-graph component 120 may receive the answer as an output from the LLM. The knowledge-graph component 120 may add, to the knowledge graph, the answer for the query. For instance, the knowledge-graph system 104 may add the formal-language answer 134 to the knowledge graph 122 as a formal answer to the formal-language query 128, and/or may modify an answer in the knowledge graph 122 using the output.

The chatbot system 110 may generate a response in the natural language that includes the answer, and at 910, the chatbot system 110 may provide, via the chatbot interface 114 and to the user 106, the response in the natural language.

Figure 10A:
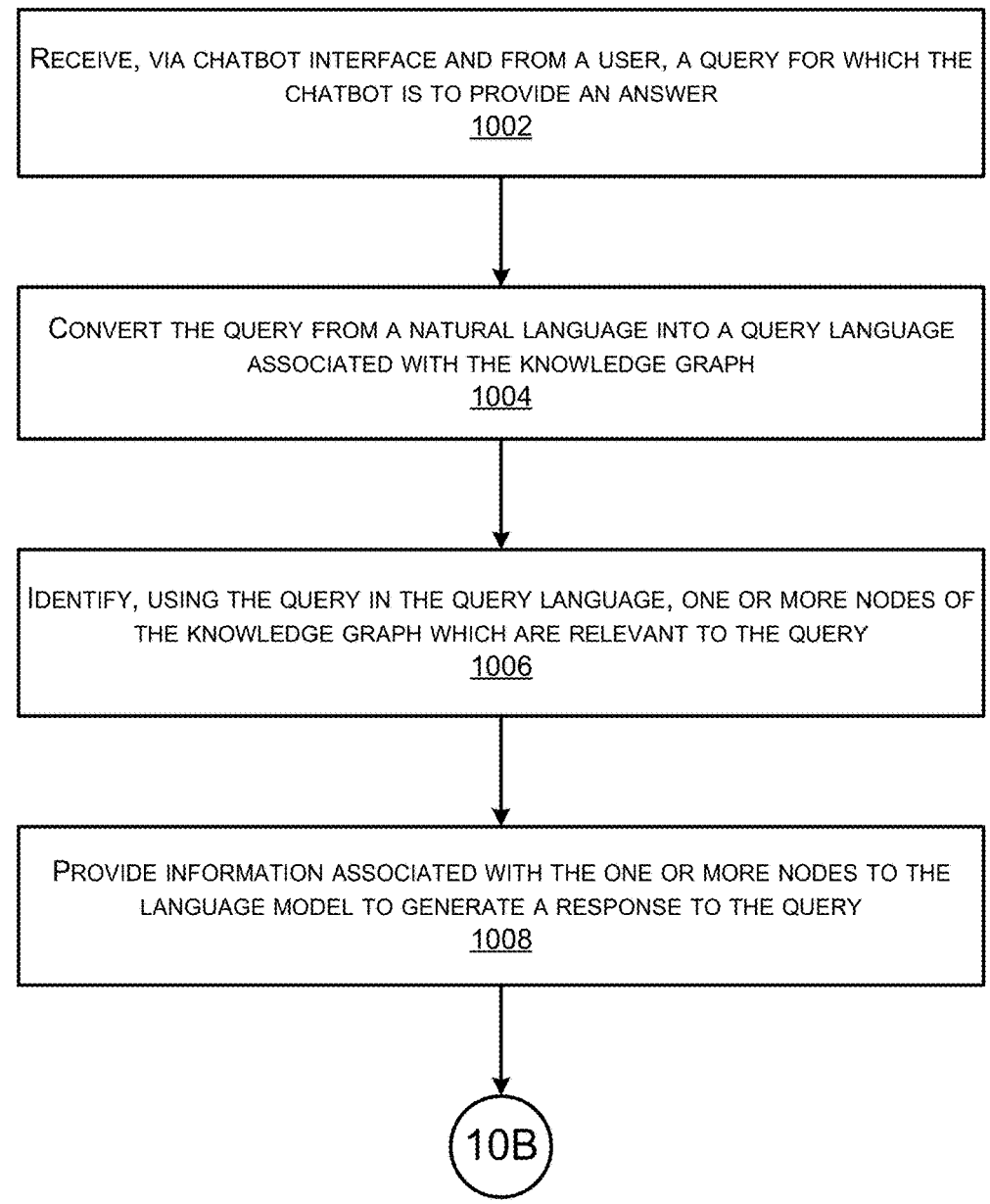
FIGS. 10A and 10B collectively illustrate a flow diagram of an example process for building a knowledge graph using answers from an LLM, receiving a query from a user, and then determining whether the knowledge graph or the LLM can answer the query.
Figure 10B:
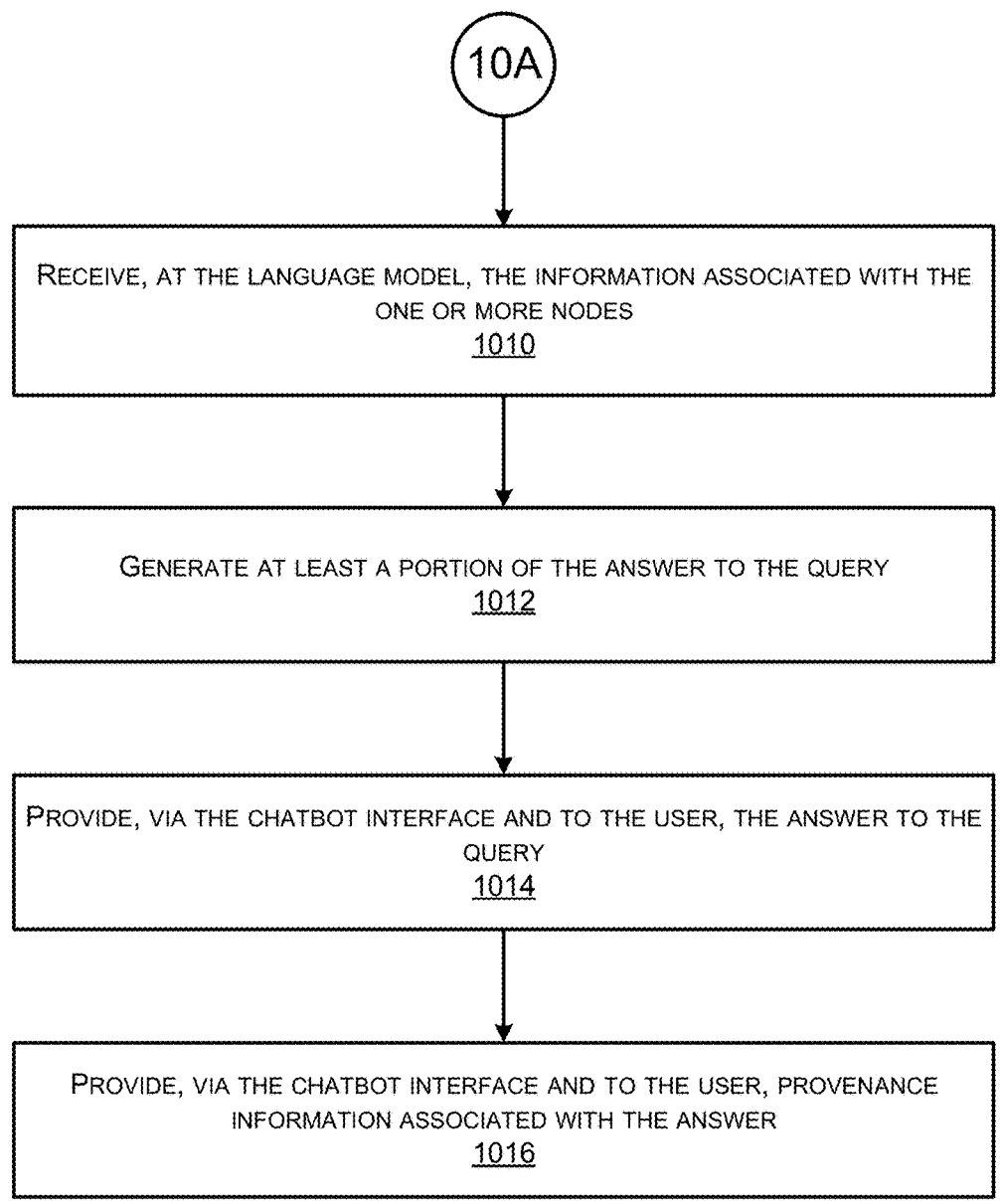

FIGS. 10A and 10B collectively illustrate a flow diagram of an example process 1000 for building a knowledge graph using answers from an LLM, receiving a query from a user, and then determining whether the knowledge graph or the LLM can answer the query.

A knowledge-graph component 120 may iteratively prompt a large language model (LLM) to determine answers to a plurality of queries. For instance, the knowledge-graph system 104 may ask the LLM 118 to build a knowledge graph 122 around one or more subject matter areas by continuing to iterate around those knowledge areas. At 1004, the knowledge-graph component 120 may receive, as outputs from the LLM, the answers to the plurality of queries.

The knowledge-graph component 120 may add the answers to a knowledge graph that is used by a chatbot to respond to users. For instance, the knowledge-graph system 104 may add the formal-language answers 134 to the knowledge graph 122 as formal answers to formal-language queries 128, and/or may modify answers in the knowledge graph 122.

At 1002, the chatbot system 110 may receive, from a user 106, a query for which the chatbot system 110 is to provide an answer. In such examples, the query may be expressed in a natural language presented by a user 106.

At 1004, the chatbot system 110 may convert the query from the natural language into a query language associated with the knowledge graph. For instance, the chatbot system 110 may include a translation component (e.g., LLM or other AI model) that translates natural language text into formal/query language text.

At 1006, a query engine may query the knowledge graph to identify one or more nodes of the knowledge graph 122 which are relevant to the query 128. For instance, the query engine 204 associated with the knowledge-graph system 104 may query the knowledge graph 122 to identify the formal-language answer 134 to the formal-language query 128 and determine the formal-language answer 134 is not included therein.

In some instances, the query engine may determine that the knowledge graph does not include the answer to the query, and a knowledge-graph component 120 may prompt the LLM to determine the answer to the query. For instance, the knowledge-graph component 120 may generate a prompt 132 for the LLM 118 that includes the natural-language query 126, the formal-language query 128, and/or a combination thereof (and potentially a relevant portion of the knowledge graph 502 and/or a known answers summarization 602). In some instances, knowledge-graph system 104 may identify a portion of the knowledge graph 122 that includes information that is relevant to the formal-language query 128, and generate a prompt 132 for the LLM 118 to determine the formal-language answer 134 to the formal-language query 128 where the prompt 132 includes the portion of the knowledge graph 122 and the formal-language query 128.

At 1008, the knowledge-graph component 120 may provide information associated with the one or more nodes to the LLM to generate a response to the query. The knowledge-graph component 120 may receive the answer as an output from the LLM. The knowledge-graph component 120 may add, to the knowledge graph, the answer for the query. For instance, the knowledge-graph system 104 may add the formal-language answer 134 to the knowledge graph 122 as a formal answer to the formal-language query 128, and/or may modify an answer in the knowledge graph 122 using the output. At 1010, the language model may receive the information associated with the one or more nodes. For instance, the prompt-engineering component 208 submits a prompt 128 that includes information expressed in the one or more nodes.

The chatbot system 110 may generate a response in the natural language that includes the answer at 1012, and at 1014, the chatbot system 110 may provide, via the chatbot interface 114 and to the user 106, the response in the natural language.

At 1010, the language model may receive the information associated with the one or more nodes (e.g., a prompt 132 that includes information expressed in the one or more nodes). At 1012, the language model may generate at least a portion of the answer to the query.

At 1014, the chatbot system 110 may provide the user with the answer via the chatbot. This can include providing the answer to the user as it is in the knowledge graph, or providing the answer from the knowledge graph to the language model for use in generating an output that will be provided to the user. Retrieval augmented generation (RAG) retrieves data from outside the language model and augments the provided prompts by adding the relevant retrieved data in context. RAG can help reduce model hallucinations by guiding the output to be similar to or based on the retrieved information. Accordingly, information from one or more nodes in the knowledge graph may be retrieved from the knowledge graph and added to the context window of the language model.

In some instances, in response to determining that the answer is not included in the knowledge graph, the knowledge-graph component 120 may prompt the language model to determine the answer to the query, receive, as output from the language model, the answer to the query, add the answer to the knowledge graph, and provide the user with the answer via the chatbot. Additionally, it is possible to implement safeguards in the generated knowledge graph, for example to prevent certain concepts from being represented in the knowledge graph, or to ensure that the knowledge graph maintains certain desirable properties. Formal specifications of the knowledge graph can be evaluated as each new triple is added, and triples that would cause the knowledge graph to violate those desirable properties can be rejected.

At 1016, an output generated using nodes of the knowledge graph can also be provided with provenance information. The information in the nodes is associated with its provenance (e.g., a link, citation, or other identifying info about the original source such as author, title, etc., or acknowledgement that it was AI generated). When an answer is generated based on these nodes, the user 106 may also receive the provenance information, for example as footnotes, embedded in the response, or as a separate provenance report linked to from the answer. Or, provenance information may only be provided upon request if the user explicitly asks for it, or if there's something wrong with the answer and the user wants to root cause the mistakes in the response by checking if there are mistakes in the knowledge graph. Another alternative is that the provenance information can be provided in systems where explainability is key (e.g., a domain-specific medical AI assistant, where a physician wants to understand why the assistant may be recommending a particular diagnosis or course of treatment before finalizing a plan for the patient; a domain-specific legal AI assistant where an attorney needs to fact check its output in terms of the statutes and cases that influenced its output, etc.).

Figure 11:
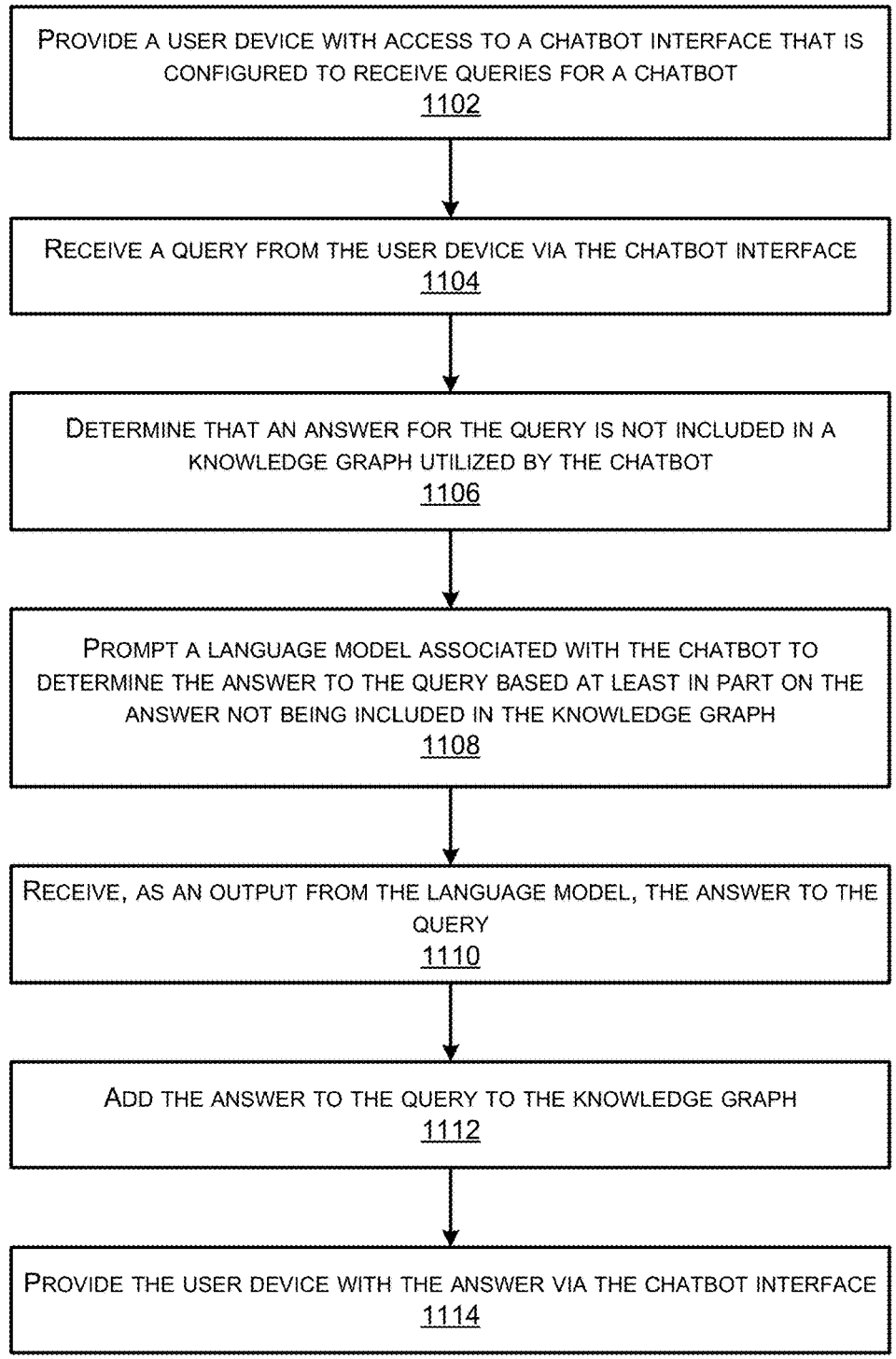
FIG. 11 illustrates a flow diagram of an example process for a chatbot to receive a query from a user device, use an LLM to determine an answer for a query, and add the answer for the query to a knowledge graph for future use.

FIG. 11 illustrates a flow diagram of an example process for a chatbot to receive a query from a user device, use an LLM to determine an answer for a query, and add the answer for the query to a knowledge graph for future use.

At 1102, a chatbot system 110 may provide a user device with access to a chatbot interface that is configured to receive queries for a chatbot. At 1104, a chatbot system 110 may receive a query from the user device via the chatbot interface. For instance, the knowledge-graph system 104 may receive a natural-language query 126 via a chatbot system 110 and from a user 106.

At 1106, a chatbot system 110 may determine that an answer for the query is not included in a knowledge graph utilized by the chatbot. For instance, the query engine 204 associated with the knowledge-graph system 104 may query the knowledge graph 122 to identify the formal-language answer 134 to the formal-language query 128 and determine the formal-language answer 134 is not included therein.

At 1108, a chatbot system 110 may, based at least in part on the answer not being included in the knowledge graph, prompt a language model associated with the chatbot to determine the answer to the query. For instance, the knowledge-graph component 120 may generate a prompt 132 for the LLM 118 that includes the natural-language query 126, the formal-language query 128, and/or a combination thereof (and potentially a relevant portion of the knowledge graph 502 and/or a known answers summarization 602).

At 1110, a chatbot system 110 may receive, as an output from the language model, the answer to the query. At 1112, a chatbot system 110 may add the answer to the query to the knowledge graph. For instance, the knowledge-graph system 104 may add the formal-language answer 134 to the knowledge graph 122 as a formal answer to the formal-language query 128, and/or may modify an answer in the knowledge graph 122 using the output. At 1114, a chatbot system 110 may provide the user device with the answer via the chatbot interface.

Figure 12:
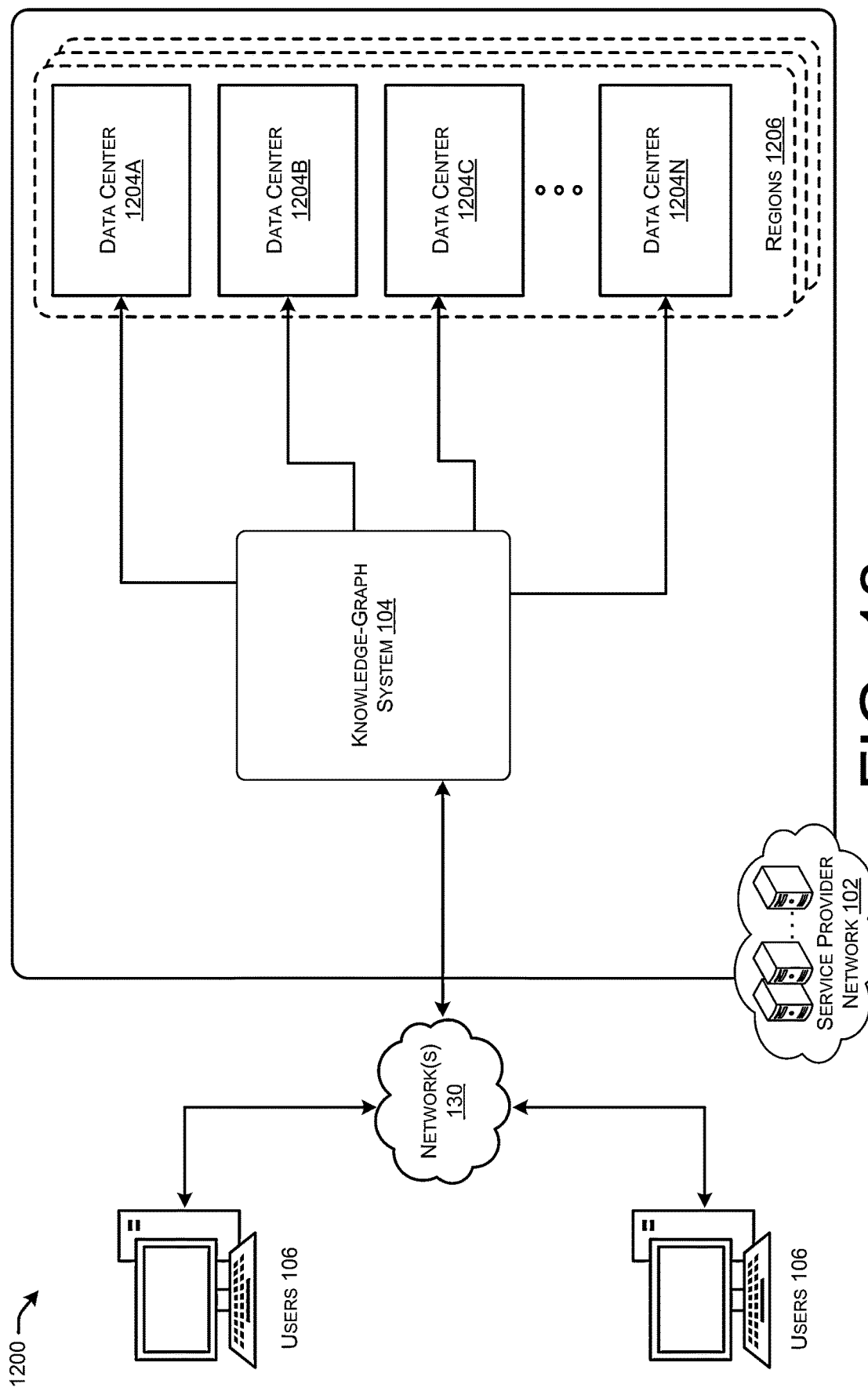
FIG. 12 is a system and network diagram that shows an illustrative operating environment that includes data centers of a service provider system that can be configured to implement aspects of the functionality described herein.

FIG. 12 is a system and network diagram 1200 that shows an illustrative operating environment that includes data centers 1204 in one or more regions 1206 of a service provider system 102 that can be configured to implement aspects of the functionality described herein. The service provider system 102 can provide computing resources, like VM instances and storage, on a permanent or an as-needed basis. Among other types of functionality, the computing resources provided by the service provider system 102 may be utilized to implement the various services described above. As also discussed above, the computing resources provided by the service provider system 102 can include various types of computing resources, such as data processing resources like VM instances, data storage resources, networking resources, data communication resources, network services, and the like.

Each type of computing resource provided by the service provider system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider system 102 can also be configured to provide other types of computing resources not mentioned specifically herein.

The computing resources provided by the service provider system 102 may be enabled in one embodiment by one or more data centers 1204A-1204N (which might be referred to herein singularly as "a data center 1204" or in the plural as "the data centers 1204"). The data centers 1204 are facilities utilized to house and operate computer systems and associated components. The data centers 1204 typically include redundant and backup power, communications, cooling, and security systems. The data centers 1204 can also be located in geographically disparate locations, or regions 1206. One illustrative embodiment for a data center 1204 that can be utilized to implement the technologies disclosed herein will be described below with regard to FIG. 13.

The users 106 may utilize user devices 108 to access the service provider system 102 and the computing resources provided by the service provider system 102 over any wired and/or wireless network(s) 130, which can be a wide area communication network ("WAN"), such as the Internet, an intranet or an Internet service provider ("ISP") network or a combination of such networks. For example, and without limitation, a user device 108 operated by a user 106 of the service provider system 102 may be utilized to access the service provider system 102 by way of the network(s) 130. It should be appreciated that a local-area network ("LAN"), the Internet, or any other networking topology known in the art that connects the data centers 1204 to remote clients and other users can be utilized. It should also be appreciated that combinations of such networks can also be utilized.

Figure 13:
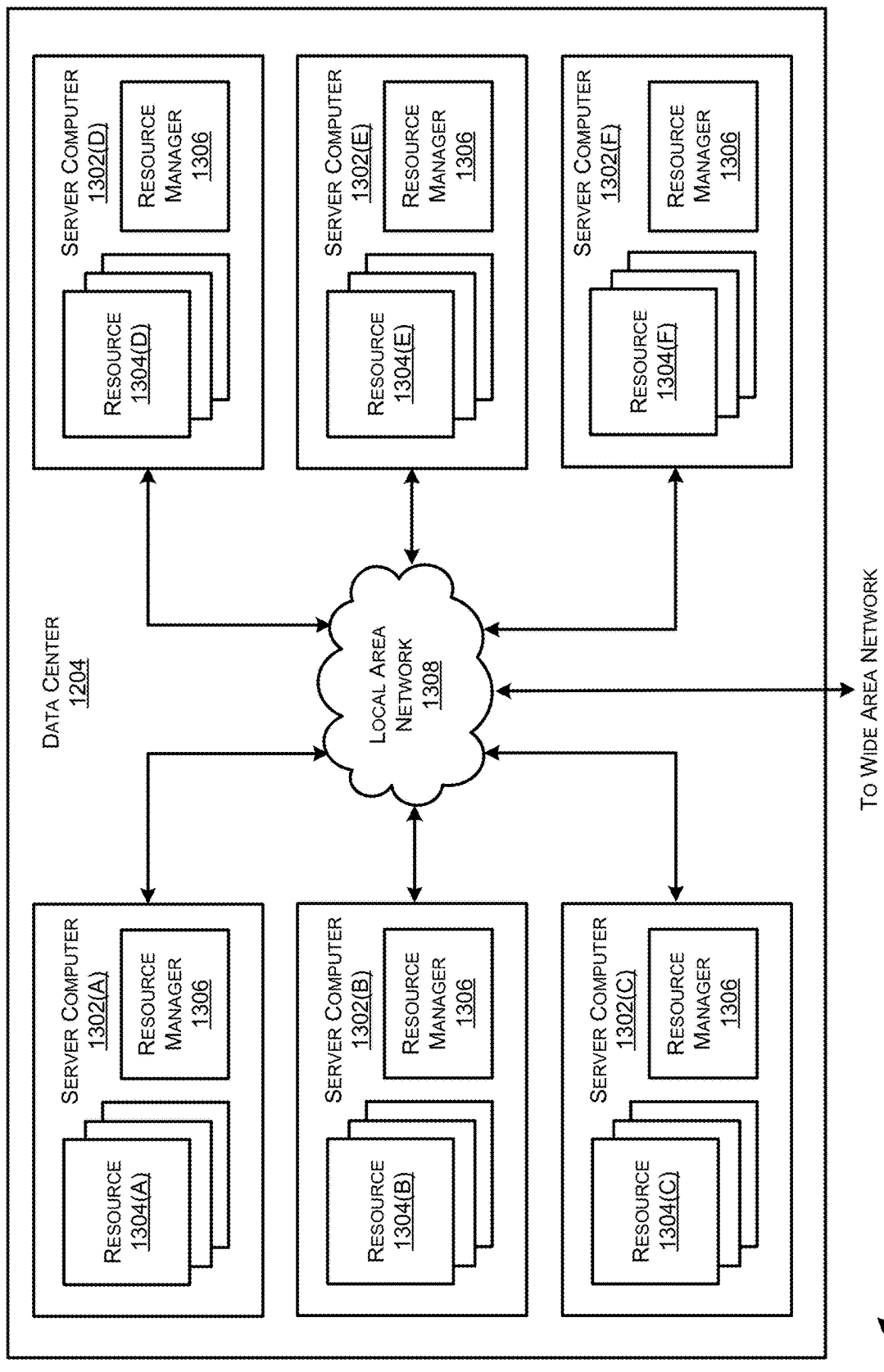
FIG. 13 is a computing system diagram illustrating a configuration for a data center that can be utilized to implement aspects of the technologies disclosed herein.

FIG. 13 is a computing system diagram 1300 that illustrates one configuration for a data center 1204 that implements aspects of the technologies disclosed herein. The example data center 1204 shown in FIG. 13 includes several server computers 1302A-1302F (which might be referred to herein singularly as "a server computer 1302" or in the plural as "the server computers 1302") for providing computing resources 1304A-1304E. In some examples, the resources 1304 and/or server computers 1302 may include, be included in, or correspond to, the computing devices described herein.

The server computers 1302 can be standard tower, rack-mount, or blade server computers configured appropriately for providing the computing resources described herein (illustrated in FIG. 13 as the computing resources 1304A-1304E). As mentioned above, the computing resources provided by the service provider system 102 can be data processing resources such as VM instances or hardware computing systems, database clusters, computing clusters, storage clusters, data storage resources, database resources, networking resources, and others. Some of the servers 1302 can also be configured to execute a resource manager 1302 capable of instantiating and/or managing the computing resources. In the case of VM instances, for example, the resource manager 1302 can be a hypervisor or another type of program configured to enable the execution of multiple VM instances on a single server computer 1302. Server computers 1302 in the data center 1204 can also be configured to provide network services and other types of services.

In the example data center 1204 shown in FIG. 13, an appropriate LAN 1308 is also utilized to interconnect the server computers 1302A-1302F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1304A-1304N, between each of the server computers 1302A-1302F in each data center 1204, and, potentially, between computing resources in each of the server computers 1302. It should be appreciated that the configuration of the data center 1204 described with reference to FIG. 13 is merely illustrative and that other implementations can be utilized.

Figure 14:
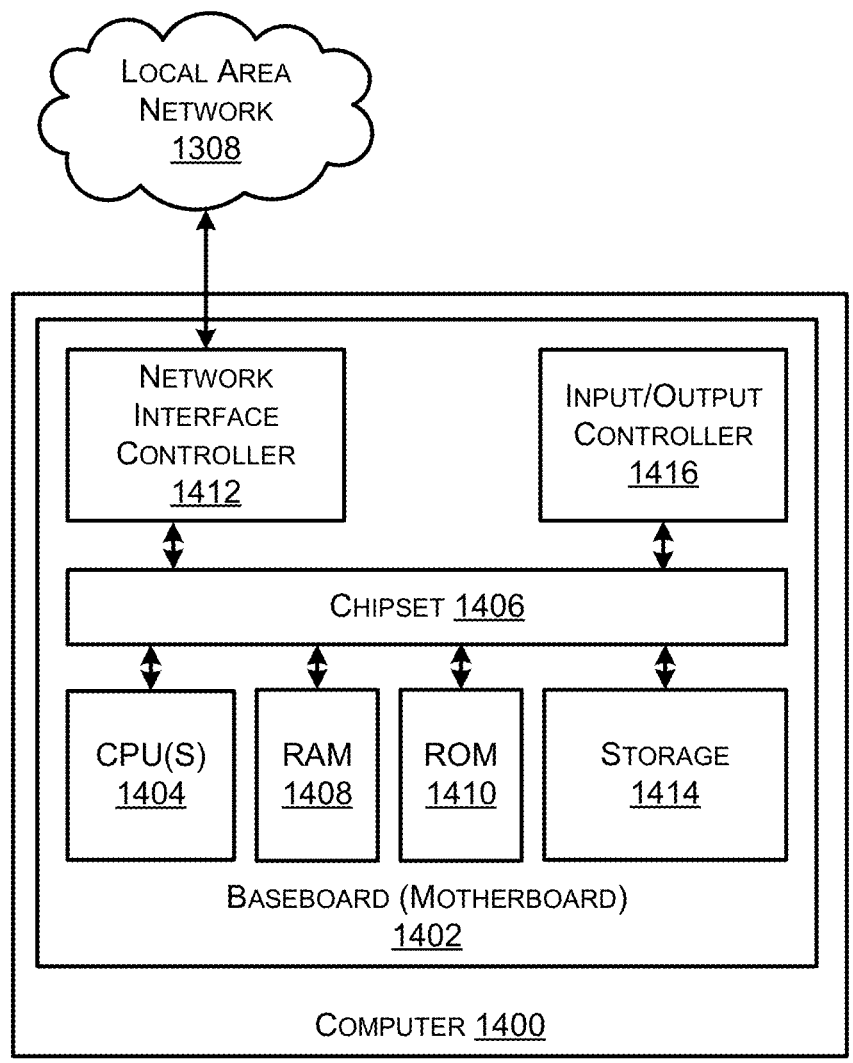
FIG. 14 is a computer architecture diagram showing an illustrative computer hardware architecture for implementing a computing device that can be utilized to implement aspects of the various technologies presented herein.

FIG. 14 shows an example computer architecture for a computer 1400 capable of executing program components for implementing the functionality described above. The computer architecture shown in FIG. 14 illustrates a conventional server computer, workstation, desktop computer, laptop, tablet, network appliance, e-reader, smartphone, or other computing device, and can be utilized to execute any of the software components presented herein.

The computer 1400 includes a baseboard 1402, or "motherboard," which is a printed circuit board to which a multitude of components or devices can be connected by way of a system bus or other electrical communication paths. In one illustrative configuration, one or more central processing units ("CPUs") 1404 operate in conjunction with a chipset 1406. The CPUs 1404 can be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1406 provides an interface between the CPUs 1404 and the remainder of the components and devices on the baseboard 1402. The chipset 1406 can provide an interface to a RAM 1408, used as the main memory in the computer 1400. The chipset 1406 can further provide an interface to a computer-readable storage medium such as a read-only memory ("ROM") 1410 or non-volatile RAM ("NVRAM") for storing basic routines that help to startup the computer 1400 and to transfer information between the various components and devices. The ROM 1410 or NVRAM can also store other software components necessary for the operation of the computer 1400 in accordance with the configurations described herein.

The computer 1400 can operate in a networked environment using logical connections to remote computing devices and computer systems through a network, such as the network 130. The chipset 1406 can include functionality for providing network connectivity through a network interface controller (NIC) 1412, such as a gigabit Ethernet adapter. The NIC 1412 is capable of connecting the computer 1400 to other computing devices over the network 1108 or network 130. It should be appreciated that multiple NICs 1412 can be present in the computer 1400, connecting the computer to other types of networks and remote computer systems.

The computer 1400 can include storage 1414 (e.g., disk) that provides non-volatile storage for the computer. The storage 1414 can consist of one or more physical storage units. The storage 1414 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 can further read information from the storage 1414 by detecting the physical states or characteristics of one or more particular locations within the physical storage units.

In addition to the storage 1414 described above, the computer 1400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1400. In some examples, the operations performed by the service provider system 102, and or any components included therein, may be supported by one or more devices similar to computer 1400. Stated otherwise, some or all of the operations performed by the service provider system 102, and or any components included therein, may be performed by one or more computer devices 1400 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1414 can store an operating system utilized to control the operation of the computer 1400. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1414 can store other system or application programs and data utilized by the computer 1400.

In one embodiment, the storage 1414, RAM 1408, ROM 1410, and/or other computer-readable storage media may be encoded with computer-executable instructions which, when loaded into the computer 1400, transform the computer from a general-purpose computing system into a special-purpose computer capable of implementing the embodiments described herein. These computer-executable instructions transform the computer 1400 by specifying how the CPUs 1404 transition between states, as described above. According to one embodiment, the computer 1400 has access to computer-readable storage media storing computer-executable instructions which, when executed by the computer 1400, perform the various techniques described above. The computer 1400 can also include computer-readable storage media having instructions stored thereupon for performing any of the other computer-implemented operations described herein.

The computer 1400 can also include one or more input/output controllers 1416 for receiving and processing input from a number of input devices, such as a keyboard, a mouse, a touchpad, a touch screen, an electronic stylus, or other type of input device. Similarly, an input/output controller 1416 can provide output to a display, such as a computer monitor, a flat-panel display, a digital projector, a printer, or other type of output device. It will be appreciated that the computer 1400 might not include all of the components shown in FIG. 14, can include other components that are not explicitly shown in FIG. 14, or might utilize an architecture completely different than that shown in FIG. 14.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method, comprising:
  receiving, at a chatbot, a query expressed in a natural language;
  converting the query from the natural language into a formal query language associated with a knowledge graph;
  querying, by a query engine, the knowledge graph to identify one or more nodes of the knowledge graph which are relevant to the query;
  providing information associated with the one or more nodes to a large language model ("LLM") to generate a formal language response to the query;
  validating an accuracy of the formal language response to the formal query language returned by the LLM; and
  subsequent to validating the accuracy of the formal language response:
    converting the formal language response into a natural language response;
    providing, via the chatbot, the natural language response;
    determining, based at least in part on the formal language response, to update the information in the knowledge graph; and
    updating the knowledge graph by at least one of:

modifying at least a portion of the information in the knowledge graph to correct the information so that the information corresponds to the formal language response;
removing, from the knowledge graph and based at least in part on the formal language response, the information; or
adding the formal language response as new information to the knowledge graph.

2. The computer-implemented method of claim 1, further comprising:
receiving, via the chatbot, feedback data indicating that the natural language response is an incorrect answer for the query;
wherein determining to update the knowledge graph is further based at least in part on the feedback data.

3. The computer-implemented method of claim 1, further comprising:
receiving, via the chatbot, a request to provide an indication of a source of the natural language response provided by the chatbot;
identifying provenance data stored in the knowledge graph that include the indication of the source of the natural language response; and
providing, via the chatbot, the indication of the source of the natural language response.

4. The computer-implemented method of claim 1, further comprising:
receiving, via the chatbot, feedback data indicating a dissatisfaction with the natural language response;
prompting the LLM to determine a second response to the query;
receiving, as second output from the LLM, the second response to the query;
adding, to the knowledge graph, the second response for the query; and
providing, via the chatbot, the second response as a second natural language response.

5. A system, comprising:
a chatbot component configured to, at least:
receive, via a chatbot interface, a query for which the chatbot component is to provide an answer; and
provide, via the chatbot interface, the answer to the query;
a knowledge-graph component configured to, at least:
convert the query from a natural language into a formal query language associated with a knowledge graph;
identify, using the query in the formal query language, a node of the knowledge graph that is relevant to the query;
provide information associated with the node to a language model to generate a formal language answer to the query;
validate an accuracy of the formal language answer to the formal query language returned by the language model; and
subsequent to validation of the accuracy of the formal language answer:
convert the formal language answer into the answer, wherein the answer is a natural language answer;
update the knowledge graph by at least one of:
modifying at least a portion of the information in the knowledge graph to correct the information so the information corresponds to the formal language answer;
removing, from the knowledge graph and based at least in part on the formal language answer, the information; or
adding the formal language answer as new information to the knowledge graph; and
the language model configured to, at least:
receive the information associated with the node; and
generate, using the information, at least a portion of the formal language answer.

6. The system of claim 5, wherein:
the knowledge graph is associated with an account and a first subject-matter domain;
the knowledge-graph component is further configured to at least:
determine that the account is associated with a second knowledge graph that is associated with a second subject-matter domain;
determine that a second query of the account is associated with the first subject-matter domain; and
determine, based at least in part on the second query being associated with first subject-matter domain, to prompt the knowledge graph for a second answer rather than prompt the second knowledge graph.

7. The system of claim 5, wherein:
the chatbot component is further configured to, at least:
receive, via the chatbot interface, feedback data indicating that a second answer is an incorrect answer for a second query; and
the knowledge-graph component is further configured to, at least:
identify a portion of the knowledge graph that was used to determine the second answer for the second query; and
at least one of modify the portion of the knowledge graph or remove the portion from the knowledge graph.

8. The system of claim 5, wherein:
the chatbot component is further configured to, at least:
receive, via the chatbot interface, a request for an indication of a source of the answer;
the knowledge-graph component is further configured to, at least:
identify provenance data stored in the knowledge graph that includes the indication of the source of the answer; and
provide, via the chatbot interface, the indication of the source of the answer.

9. The system of claim 5, wherein:
the chatbot component is further configured to, at least:
receive, via the chatbot interface, feedback data indicating a dissatisfaction with the answer;
the knowledge-graph component is further configured to, at least:
prompt the language model to determine a second answer to the query;
receive, as second output from the language model, the second answer;
add, to the knowledge graph, the second answer; and
provide the second answer as a second natural language answer.

10. The system of claim 5, wherein:
the chatbot component is further configured to, at least:
receive, via the chatbot interface, a request for an explanation as to why the answer was provided for the query;
the knowledge-graph component is further configured to, at least:

identify a portion of the knowledge graph that was used to determine the answer; and
use information in the portion of the knowledge graph to generate the explanation as to why the answer was provided for the query; and
the chatbot component is further configured to, at least: provide the explanation via the chatbot interface.

11. The system of claim 5, wherein:
the knowledge-graph component is further configured to, at least:
prompt the language model to determine a second answer to a second query;
receive, as a second output from the language model, the second answer to the second query;
determine that the second answer is associated with a concept that is disallowed from being represented in the knowledge graph; and
refrain from adding the second answer to the knowledge graph.

12. The system of claim 5, further comprising:
a prompt-engineering component configured to, at least:
determine that a size of the query is greater than a context window size of the language model;
split the query into a first query portion having a first size that is less than the context window size and a second query portion having a second size that is less than the context window size; and
prompt the language model to determine the formal language answer by providing the language model with the first query portion separately from the second query portion.

13. The system of claim 5, wherein validate the accuracy of the formal language answer includes:
validate, with a second language model, the accuracy of the formal language answer to the formal query language returned by the language model.

14. One or more non-transitory computer-readable media storing computer-executable instructions that, when executed by one or more processors, cause the one or more processors to perform operations comprising:
receiving, via a chatbot interface of a chatbot, a query expressed in a natural language;
converting the query from the natural language into a formal query language associated with a knowledge graph;
querying, using the query in the formal query language, the knowledge graph to identify a node of the knowledge graph;
providing information associated with the node to a language model;
receive, from the language model and based at least in part on the information, a formal language response to the query;
converting the formal language response to a natural language response;
providing, via the chatbot, the natural language response;
determining, based at least in part on the formal language response, to update the information in the knowledge graph; and
updating the knowledge graph by at least one of:
modifying at least a portion of the information in the knowledge graph to correct the information so that the information corresponds to the formal language response;
removing, from the knowledge graph and based at least in part on the formal language response, the information; or adding the formal language response as new information to the knowledge graph.

15. The one or more non-transitory computer-readable media of claim 14, wherein the knowledge graph is associated with an account and is associated with a first subject-matter domain,
the operations further comprising:
determining that the account is associated with a second knowledge graph that is associated with a second subject-matter domain;
determining that the query is associated with the first subject-matter domain; and
determining, based at least in part on the query being associated with the first subject-matter domain, to prompt the knowledge graph for the formal language response rather than the second knowledge graph.

16. The one or more non-transitory computer-readable media of claim 14, the operations further comprising:
receiving, via the chatbot interface, feedback data indicating that the natural language response is an incorrect response for the query;
wherein the determining to update the information in the knowledge graph is further determined based at least in part on the feedback data.

17. The one or more non-transitory computer-readable media of claim 14, the operations further comprising:
receiving, via the chatbot interface, a request for an indication of a source of the natural language response;
identifying provenance data stored in the knowledge graph that includes the indication of the source of the natural language response; and
providing, via the chatbot, the indication of the source of the natural language response.

18. The one or more non-transitory computer-readable media of claim 14, the operations further comprising:
receiving, via the chatbot interface, feedback data indicating a dissatisfaction with the natural language response provided for the query;
prompting the language model to determine a second response to the query;
receiving, as a second output from the language model, the second response to the query;
adding, to the knowledge graph, the second response for the query; and
providing, via the chatbot interface, the second response as a second natural language response.

19. The one or more non-transitory computer-readable media of claim 14, the operations further comprising:
receiving, via the chatbot interface, a request for an explanation as to why the natural language response was provided for the query;
identifying a portion of the knowledge graph that was used to determine the natural language response for the query;
using information in the portion of the knowledge graph, generating the explanation as to why the natural language response was provided for the query; and
providing the explanation via the chatbot interface.

20. The one or more non-transitory computer-readable media of claim 14, the operations further comprising:
prompting the language model to determine a second response to a second query;
receiving, as a second output from the language model, the second response to the second query;
determining that the second response is associated with a concept that is disallowed from being represented in the knowledge graph; and refraining from adding the second response to the knowledge graph.

21. The one or more non-transitory computer-readable media of claim 14, the operations further comprising:
sending a plurality of formal language queries to the language model requesting that the language model provide formal language answers to each of the plurality of formal language queries; and
generating the knowledge graph by adding a plurality of formal language answers received from the language model as new information to the knowledge graph.

22. The one or more non-transitory computer-readable media of claim 21, the operations further comprising:
generating the plurality of formal language queries based on one or more of:
a frequently asked questions database;
a customer help forum; or
a subject matter area.

* * * * *